US012602545B2

(12) United States Patent
Vu et al.

(10) Patent No.: US 12,602,545 B2
(45) Date of Patent: Apr. 14, 2026

(54) WIDE AND DEEP NETWORK FOR LANGUAGE DETECTION USING HASH EMBEDDINGS

(71) Applicant: Oracle International Corporation, Redwood Shores, CA (US)

(72) Inventors: Thanh Tien Vu, Herston (AU); Poorya Zaremoodi, Melbourne (AU); Duy Vu, Melbourne (AU); Mark Edward Johnson, Sydney (AU); Thanh Long Duong, Seabrook (AU); Xu Zhong, Melbourne (AU); Vladislav Blinov, Melbourne (AU); Cong Duy Vu Hoang, Wantirna South (AU); Yu-Heng Hong, Carlton (AU); Vinamr Goel, Ghaziabad (IN); Philip Victor Ogren, Boulder, CO (US); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 437 days.

(21) Appl. No.: 18/052,694

(22) Filed: Nov. 4, 2022

(65) Prior Publication Data

US 2023/0141853 A1 May 11, 2023

Related U.S. Application Data

(60) Provisional application No. 63/263,728, filed on Nov. 8, 2021.

(51) Int. Cl.
| | |
|---|---|
| *G06F 40/263* | (2020.01) |
| *G06F 16/31* | (2019.01) |
| *H04L 51/02* | (2022.01) |

(52) U.S. Cl.
CPC .......... *G06F 40/263* (2020.01); *G06F 16/325* (2019.01); *H04L 51/02* (2013.01)

(58) Field of Classification Search
CPC ....... G06F 40/263; G06F 16/325; H04L 51/02
See application file for complete search history.

(56) References Cited

U.S. PATENT DOCUMENTS

| | | | | |
|---|---|---|---|---|
| 10,803,050 | B1 * | 10/2020 | Salkola | G06N 3/09 |
| 2014/0223565 | A1 * | 8/2014 | Cohen | G06F 21/564 |
| | | | | 726/23 |

(Continued)

FOREIGN PATENT DOCUMENTS

| | | |
|---|---|---|
| CN | 110955745 A | 4/2020 |

OTHER PUBLICATIONS

Palangi et al. "Deep Sentence Embedding Using Long Short-Term Memory Networks: Analysis and Application to Information Retrieval", Jan. 16, 2016. (Year: 2016).*

(Continued)

*Primary Examiner* — Matthew J Ellis
(74) *Attorney, Agent, or Firm* — Kilpatrick Townsend & Stockton LLP

(57) ABSTRACT

Techniques disclosed herein relate generally to language detection. In one particular aspect, a method is provided that includes obtaining a sequence of n-grams of a textual unit; using an embedding layer to obtain an ordered plurality of embedding vectors for the sequence of n-grams; using a deep network to obtain an encoded vector that is based on the ordered plurality of embedding vectors; and using a classifier to obtain a language prediction for the textual unit that is based on the encoded vector. The deep network includes an attention mechanism, and using the embedding layer to obtain the ordered plurality of embedding vectors comprises, for each n-gram in the sequence of n-grams:

(Continued)

obtaining hash values for the n-gram; based on the hash values, selecting component vectors from among the plurality of component vectors; and obtaining an embedding vector for the n-gram that is based on the component vectors.

20 Claims, 18 Drawing Sheets

(56) References Cited

U.S. PATENT DOCUMENTS

| | | | |
|---|---|---|---|
| 2016/0042359 A1* | 2/2016 | Singh | G06F 40/30 |
| | | | 704/2 |
| 2017/0300691 A1 | 10/2017 | Upchurch | |
| 2019/0019503 A1 | 1/2019 | Henry | |
| 2019/0306107 A1* | 10/2019 | Galbraith | H04L 51/56 |
| 2020/0233927 A1* | 7/2020 | Berger | G06F 40/216 |
| 2021/0042800 A1* | 2/2021 | Chandra | H04L 51/02 |
| 2021/0192140 A1* | 6/2021 | Galley | G06N 3/08 |
| 2021/0294781 A1 | 9/2021 | Fernandez Musoles et al. | |
| 2021/0295822 A1* | 9/2021 | Tomkins | G06F 16/3338 |
| 2022/0012247 A1* | 1/2022 | Oukid | G06F 16/9035 |
| 2022/0092276 A1* | 3/2022 | Tu | G06F 40/58 |
| 2022/0414344 A1* | 12/2022 | Makki Niri | G06F 40/30 |

OTHER PUBLICATIONS

Vinayakumar et al. Dec. 27, 2018, "Deep Learning Approach for Intelligent Intrusion Detection System", https://ieeexplore.ieee.org/stamp/stamp.jsp?arnumber=8681044.*

Chen, Can You Explain How Exactly HashEmbed Works ?, Available Online at: https://support.prodi.gy/t/can-you-explain-how-exactly-hashembed-works/564/1, May 2018, 8 pages.
Johnson et al., Convolutional Neural Networks for Text Categorization: Shallow Word-Level vs. Deep Character-Level, Available Online at: https://arxiv.org/pdf/1609.00718.pdf, Aug. 31, 2016, pp. 1-7.
Liu et al., Multichannel CNN with Attention for Text Classification, Available Online at: https://arxiv.org/pdf/2006.16174.pdf, Jun. 29, 2020, pp. 1-13.
Serra et al., Compact Embedding of Binary-Coded Inputs and Outputs Using Bloom Filters, Available Online at: https://openreview.net/pdf?id=rkKCdAdgx, 2017, pp. 1-17.
Serra et al., Getting Deep Recommenders Fit: Bloom Embeddings for Sparse Binary Input/Output Networks, Available Online at: https://arxiv.org/pdf/1706.03993.pdf, Jun. 13, 2017, 9 pages.
Svenstrup et al., Hash Embeddings for Efficient Word Representations, Available Online at: https://arxiv.org/pdf/1709.03933.pdf, Sep. 12, 2017, pp. 1-9.
Yang et al., Hierarchical Attention Networks for Document Classification, Proceedings of the 2016 Conference of the North American Chapter of the Association for Computational Linguistics: Human Language Technologies, Jun. 12-17, 2016, pp. 1480-1489.
International Application No. PCT/US2022/049164, International Search Report and the Written Opinion, Mailed On Mar. 29, 2023, 8 pages.
Zhang et al., "Model Size Reduction Using Frequency Based Double Hashing for Recommender Systems", Available Online at: https://arxiv.org/pdf/2007.14523.pdf, Jul. 2020, 8 pages.
PCT/US2022/049164 , "International Preliminary Report on Patentability", May 16, 2024, 5 pages.

* cited by examiner output { language prediction classification (output layer) { FFN 440 (softmax activation)

encoded vector { deep learning encoder { CNN + attention 430 n-gram representations { embedding layer 420 n-grams { hello _h he el ll lo o_ there _t th he er re e_ parser 410

Input text { hello there

400

Schema

```
"type": "object",
"required": [
    "documents"
],
"properties": {
    "documents": {
        "type": "array",
        "items": {
            "type": "string",
        }
    }
}
```

Examples

```
"documents": [
    "You sound like Data",
    "Que signifie YOLO ?",
    "E ai como vai?"
]
```

*FIG. 7*

Response 200

```
{
    "code": 200,
    "message": "success",
    "documents": [
        {
            "language_name": "English",
            "language_code": "en",
            "confidence_score": 0.8051119446754456
        },
        {
            "language_name": "French",
            "language_code": "fr",
            "confidence_score": 0.8343087434768677
        },
        {
            "language_name": "Portuguese",
            "language_code": "pt",
            "confidence_score": 0.9807902574539185
        }
    ]
}
```

Response 404

```
{
    "code": 404,
    "message": "message-string",
    "documents": null
}
```

| SOURCE AND LINK | DESCRIPTION | TOTAL NUMBER OF | | |
|---|---|---|---|---|
| | | FILES | TOKENS | SENTENCE FRAGMENTS |
| Open Parallel Corpus Project (OPUS)-Wikipedia http://opus.nlpl.eu/Wikipedia.php | Parallel sentences extracted from Wikipedia: 20 languages, 36 bitexts | 114 | 610.13M | 25.90M |
| Open Parallel Corpus Project (OPUS)-Eubookshop http://opus.nlpl.eu/EUbookshop.php | Corpus of documents from the EU bookshop: 48 languages, 794 bitexts | 135,785 | 3.60G | 173.20M |
| Open Parallel Corpus Project (OPUS)-EMEA http://opus.nlpl.eu/EMEA.php | A parallel corpus made out of PDF documents from the European Medicines Agency: 22 languages, 231 bitexts | 41,957 | 311.65M | 26.51M |
| Open Parallel Corpus Project (OPUS)-GNOME http://opus.nlpl.eu/GNOME.php | A parallel corpus of GNOME localization files: 187 languages, 12,822 bitexts | 113,344 | 267.27M | 58.12M |
| Open Parallel Corpus Project (OPUS)-Europarl http://opus.nlpl.eu/Europarl.php | 21 languages, 211 bitexts | 207,775 | 759.05M | 30.32M |
| Open Parallel Corpus Project (OPUS)-Euconst http://opus.nlpl.eu/EUconst.php | 21 languages, 210 bitexts | 986 | 3.01M | 0.22M |
| Open Parallel Corpus Project (OPUS)-OpenOffice http://opus.nlpl.eu/OpenOffice.php | 8 languages, 28 bitexts | 18,120 | 3.56M | 0.62M |
| Open Parallel Corpus Project (OPUS)-infopankki-v1 http://opus.nlpl.eu/infopankki-v1.php | 12 languages, 66 bitexts | 3,646 | 7.87M | 0.79M |
| Open Parallel Corpus Project (OPUS)-MultiUN http://opus.nlpl.eu/MultiUN.php | 7 languages, 21 bitexts | 489,334 | 1.99G | 81.41M |
| Open Parallel Corpus Project (OPUS)-DGT http://opus.nlpl.eu/DGT.php | 25 languages, 299 bitexts | 817,410 | 2.13G | 113.52M |

| Model | ODA TEST (335K) | | | |
|---|---|---|---|---|
| | Accuracy | Micro-F1 | Macro-F1 | #Parameters (%) |
| 8 Languages | | | | |
| Our ODA API (Fig. 3) | 0.9928 | 0.9938 | 0.9940 | 48,142,216 (100%) |
| Our ODA-single API (single hashing - Fig. 2) | 0.9921 | 0.9933 | 0.9935 | 48,121,736 (100%) |
| Our CNN API (ODA w/o Attention) | 0.9927 | 0.9933 | 0.9935 | 48,076,168 (99.9%) |
| Our AVG API (ODA w/o Attention w/o CNN) | 0.9895 | 0.9916 | 0.9919 | 48,004,488 (99.7%) |
| Char-CNN | 0.9807 | 0.9817 | 0.9817 | 14,417,032 (29.95%) |
| fastText | 0.9803 | 0.9828 | 0.9828 | , |

*FIG. 10* language prediction

1100 classifier 1140 encoded vector deep network 1130 ordered plurality of embedding vectors embedding layer 1120 sequence of n-grams parser 1110 textual unit

1400

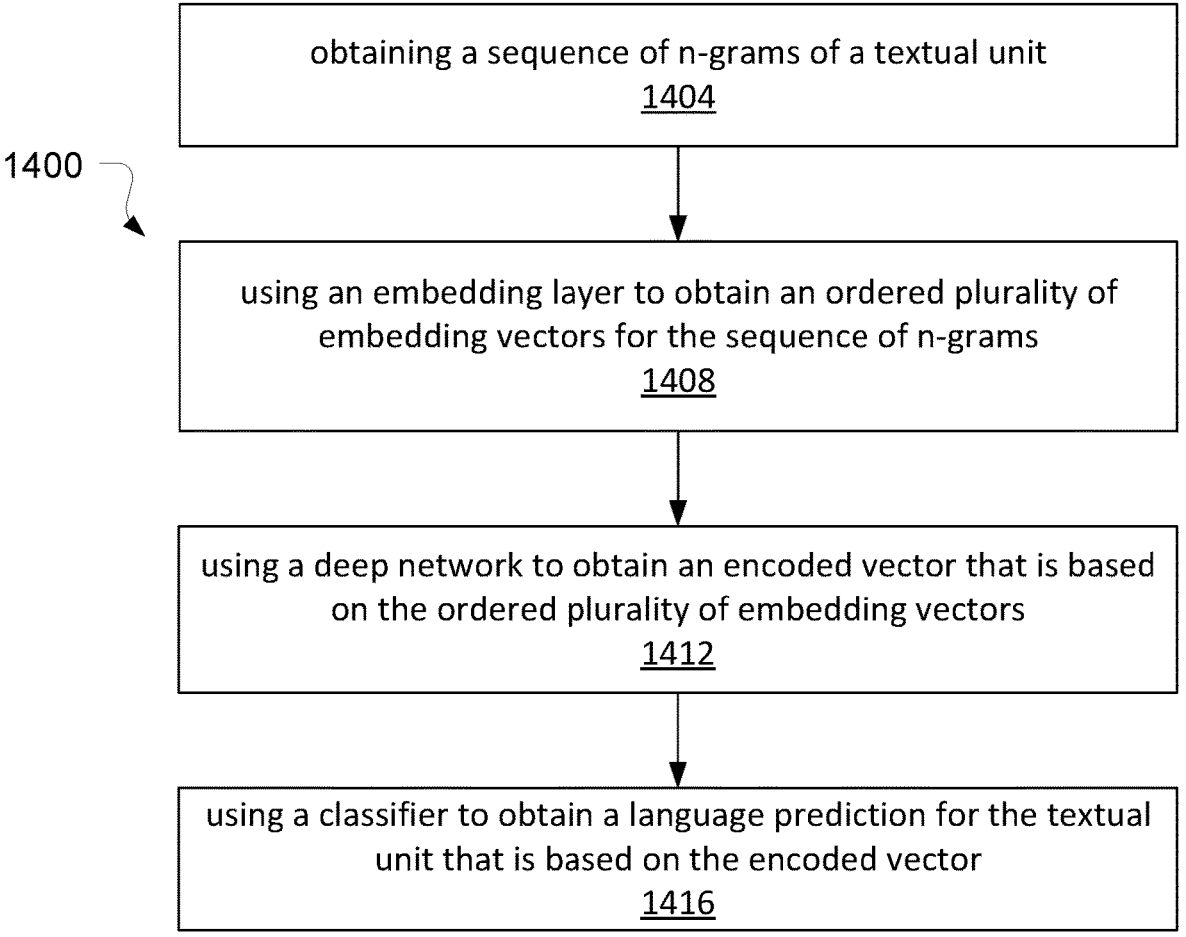

obtaining a sequence of n-grams of a textual unit
1404 using an embedding layer to obtain an ordered plurality of
embedding vectors for the sequence of n-grams
1408 using a deep network to obtain an encoded vector that is based
on the ordered plurality of embedding vectors
1412 using a classifier to obtain a language prediction for the textual
unit that is based on the encoded vector
1416

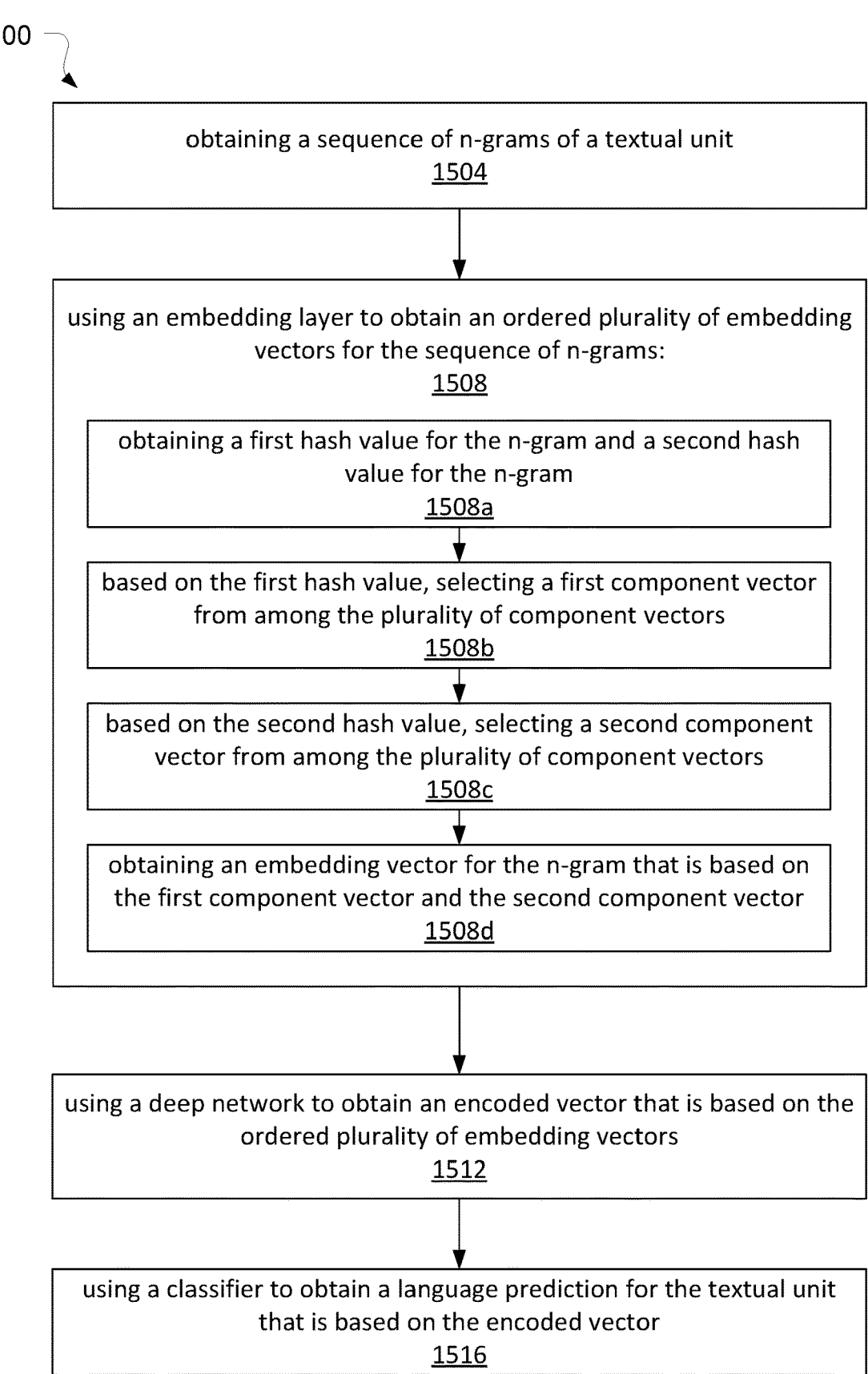

obtaining a sequence of n-grams of a textual unit
1504 using an embedding layer to obtain an ordered plurality of embedding vectors for the sequence of n-grams:
1508 obtaining a first hash value for the n-gram and a second hash value for the n-gram
1508a based on the first hash value, selecting a first component vector from among the plurality of component vectors
1508b based on the second hash value, selecting a second component vector from among the plurality of component vectors
1508c obtaining an embedding vector for the n-gram that is based on the first component vector and the second component vector
1508d using a deep network to obtain an encoded vector that is based on the ordered plurality of embedding vectors
1512 using a classifier to obtain a language prediction for the textual unit that is based on the encoded vector
1516

*FIG. 15*

Figure 16:
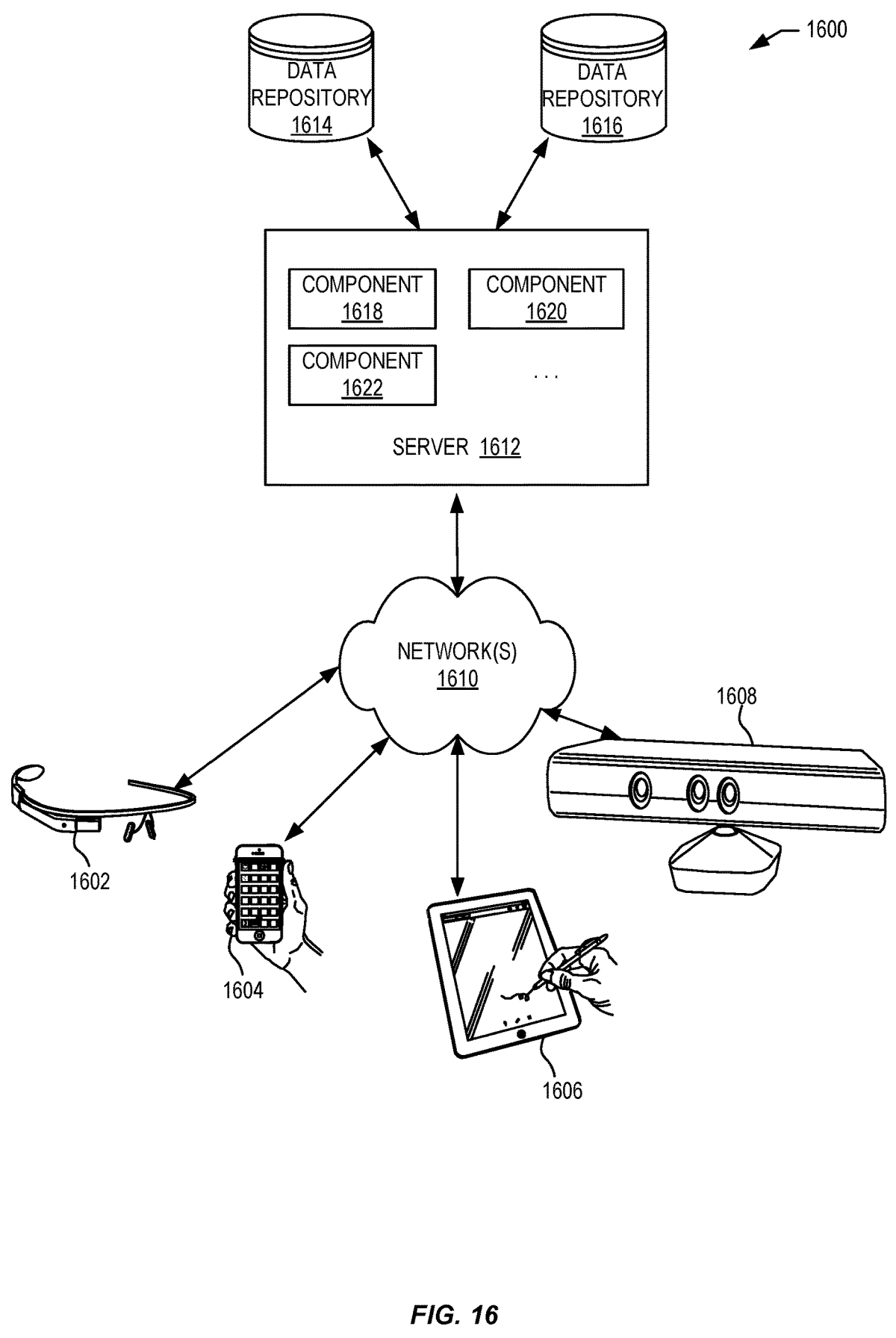

DATA REPOSITORY 1614

DATA REPOSITORY 1616

1600

COMPONENT 1618

COMPONENT 1620

COMPONENT 1622

. . .

SERVER 1612

NETWORK(S) 1610

WIDE AND DEEP NETWORK FOR LANGUAGE DETECTION USING HASH EMBEDDINGS

RELATED APPLICATIONS

This application claims priority to U.S. Provisional Patent Application No. 63/263,728, filed Nov. 8, 2021, entitled "WIDE AND DEEP NETWORK FOR LANGUAGE DETECTION USING HASHED EMBEDDINGS," which is incorporated by reference herein in its entirety for all purposes.

FIELD OF THE INVENTION

The present disclosure relates generally to natural language processing, and more particularly, to techniques for language detection.

BACKGROUND

Many users around the world are on instant messaging or chat platforms in order to get instant reactions. Organizations often use these instant messaging or chat platforms to engage with customers (or end users) in live conversations. However, it can be very costly for organizations to employ service people to engage in live communication with customers or end users. Chatbots (or "bots") have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Language detection is the task of identifying the language of a textual unit. Examples of a textual unit may include a sentence, an email, a post, a text message, a product review, a paragraph, or a document. A textual unit may be produced by a speech-to-text module in response to an utterance. Language detection is one of the very first steps for many text processing tasks, such as machine translation, text classification, etc. For example, accurate language detection may be important for enabling successful multilingual bot deployment.

BRIEF SUMMARY

Techniques disclosed herein relate generally to language detection (e.g., in natural language processing). Examples of machine-learning (ML) models that may be used to perform language detection include wide networks. For example, a machine learning approach to language detection may include presenting the input text to a wide network as a sequence of characters, or as a sequence of n-grams or subwords. Techniques disclosed herein can provide language detection for textual units.

In various embodiments, a computer-implemented method for language detection includes obtaining a sequence of n-grams of a textual unit; using an embedding layer to obtain an ordered plurality of embedding vectors for the sequence of n-grams; using a deep network to obtain an encoded vector that is based on the ordered plurality of embedding vectors; and using a classifier to obtain a language prediction for the textual unit that is based on the encoded vector. The embedding layer includes a trained model having a plurality of component vectors, and the deep network includes a trained convolutional neural network with an attention mechanism (e.g., one or more attention layers). In this method, using the embedding layer to obtain the ordered plurality of embedding vectors comprises, for each n-gram in the sequence of n-grams: obtaining a first hash value for the n-gram and a second hash value for the n-gram; based on the first hash value, selecting a first component vector from among the plurality of component vectors; based on the second hash value, selecting a second component vector from among the plurality of component vectors; and obtaining an embedding vector for the n-gram by concatenating the first component vector and the second component vector. In some embodiments, the deep network comprises a trained convolutional neural network with an attention mechanism.

In some embodiments, the sequence of n-grams includes a plurality of character-level n-grams and a plurality of word-level n-grams. In some embodiments, the value of n for the plurality of character-level n-grams is different than the value of n for the plurality of word-level n-grams.

In some embodiments, for each n-gram in the sequence of n-grams, obtaining the first hash value for the n-gram comprises applying a hash function with a first random seed value to the n-gram, and obtaining the second hash value for the n-gram comprises applying the hash function with a second random seed value to the n-gram, the second seed value being different than the first seed value.

In some embodiments, using the embedding layer to obtain the ordered plurality of embedding vectors comprises, for each n-gram in the sequence of n-grams, applying a modulo function to the first hash value to obtain a first index and applying the modulo function to the second hash value to obtain a second index, wherein selecting the first component vector is based on the first index and selecting the second component vector is based on the second index.

In some embodiments, for each n-gram in the sequence of n-grams, obtaining the embedding vector for the n-gram comprises concatenating the first component vector and the second component vector.

In some embodiments, a deep network comprising a trained convolutional neural network with an attention mechanism is used on the sequence of n-gram embedding vectors to take into account the orders of the n-grams appearing in the textual unit and resulting in the final encoded vector representing the textual unit.

In some embodiments, the classifier includes a feedforward neural network. In some embodiments, for the encoded vector of the textual unit, using the classifier comprises applying a softmax function to an output of a final layer of the feedforward neural network.

In various embodiments, an apparatus is provided that includes processing circuitry to perform part or all of one or more methods disclosed herein, and a memory coupled to the processing circuitry and to store the sequence of n-grams.

In various embodiments, a system is provided that includes one or more data processors and one or more non-transitory computer readable media storing instructions which, when executed by the one or more data processors, cause the one or more data processors to perform part or all of one or more methods disclosed herein.

In various embodiments, a computer-program product tangibly embodied in one or more non-transitory machine-readable media, including instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 7 shows an example of a request to an API in accordance with various embodiments.

FIG. 8 shows an example of a response from an API in accordance with various embodiments.

FIG. 9 shows a table that describes the OPUS source datasets.

FIG. 10 shows results from a language detection test in accordance with various embodiments.

FIG. 14 illustrates a process flow for language detection in accordance with various embodiments.

FIG. 15 illustrates a process flow for language detection in accordance with various embodiments.

FIG. 16 depicts a simplified diagram of a distributed system for implementing various embodiments.

DETAILED DESCRIPTION

Figure 1:
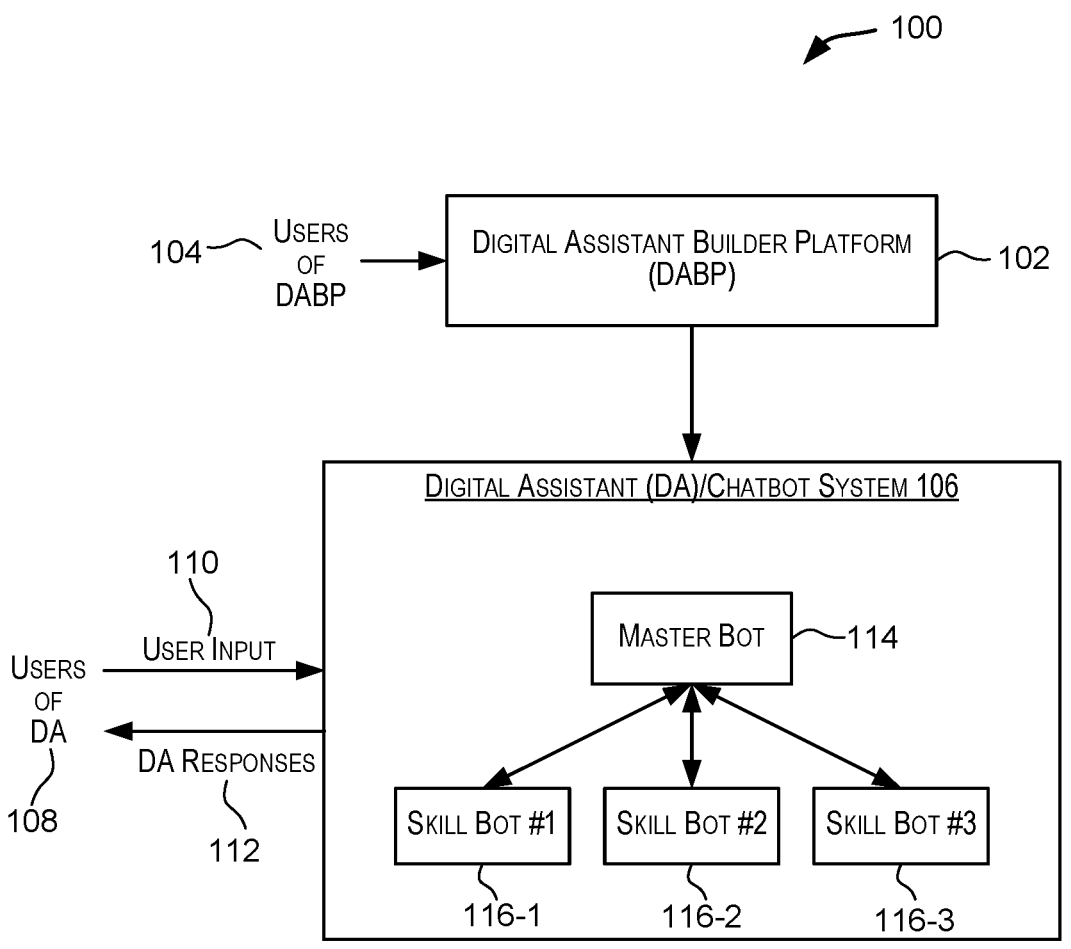
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary"

is used herein to mean "serving as an example, instance, or illustration." Any embodiment or design described herein as "exemplary" is not necessarily to be construed as preferred or advantageous over other embodiments or designs.

As used herein, when an action is "based on" something, this means the action is based at least in part on at least a part of the something. The use of "based on" is meant to be open and inclusive, in that a process, step, calculation, or other action "based on" one or more recited conditions, items, or values may, in practice, be based on additional conditions, items, or values beyond those recited. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

INTRODUCTION

Previous work has formulated the task of language detection as a text classification task. One such approach has utilized conventional feature-based machine learning (e.g., Naïve Bayes with n-gram features) to handle the task. Another such approach has utilized deep learning (e.g., a convolutional neural network (CNN) or long short-term memory (LSTM) network) to handle the task.

Techniques described herein include utilizing attention CNN (that is, CNN with an attention mechanism) with n-gram features to handle the task of language detection. For example, an approach to building a language detection application programming interface (API) for 135 languages with deep learning is described. Experiments on publicly available datasets show that such a model works competitively or better than fastText, Google and Microsoft language detection APIs.

Natural language processing has many applications. For example, a digital assistant is an artificial intelligence-driven interface that helps users accomplish a variety of tasks using natural language conversations. For each digital assistant, a customer may assemble one or more skills. Skills (also described herein as chatbots, bots, or skill bots) are individual computer programs that are focused on specific types of tasks, such as tracking inventory, submitting time cards, ordering a pizza, retrieving banking information, and creating expense reports. In order to execute tasks, a bot can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
    (1) Configuring settings for a new skill bot
    (2) Configuring one or more intents for the skill bot
    (3) Configuring one or more entities for one or more intents
    (4) Training the skill bot
    (5) Creating a dialog flow for the skill bot
    (6) Adding custom components to the skill bot as needed
    (7) Testing and deploying the skill bot
Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot— A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot— DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
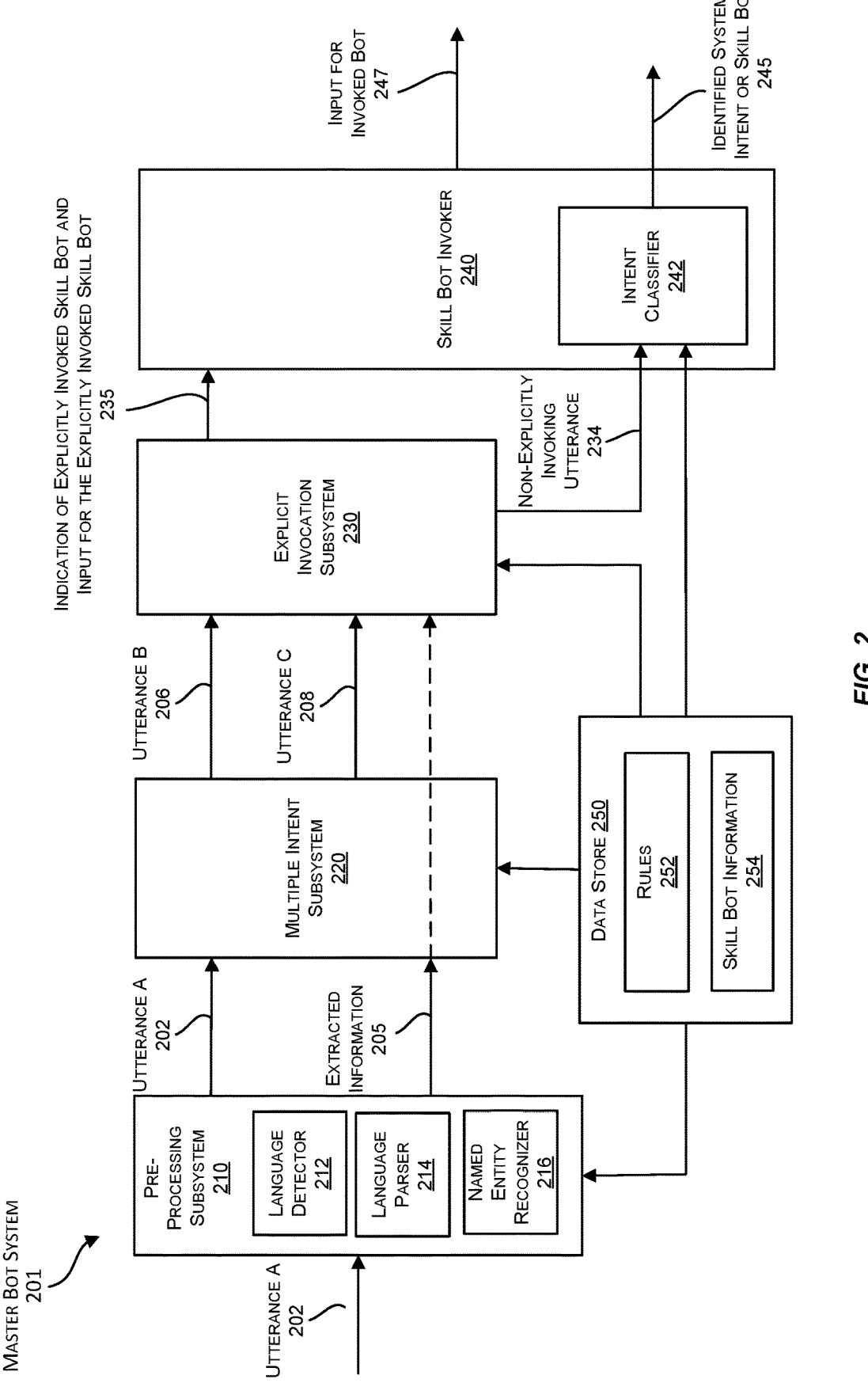
FIG. 2 is a simplified block diagram of a computing system implementing a master bot according to certain embodiments.

FIG. 2 is a simplified block diagram of a master bot (MB) system 201 according to certain embodiments. MB system 201 can be implemented in software only, hardware only, or a combination of hardware and software. MB system 201 includes a pre-processing subsystem 210, a multiple intent subsystem (MIS) 220, an explicit invocation subsystem (EIS) 230, a skill bot invoker 240, and a data store 250. MB system 201 depicted in FIG. 2 is merely an example of an arrangement of components in a master bot. One of ordinary skill in the art would recognize many possible variations, alternatives, and modifications. For example, in some implementations, MB system 201 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
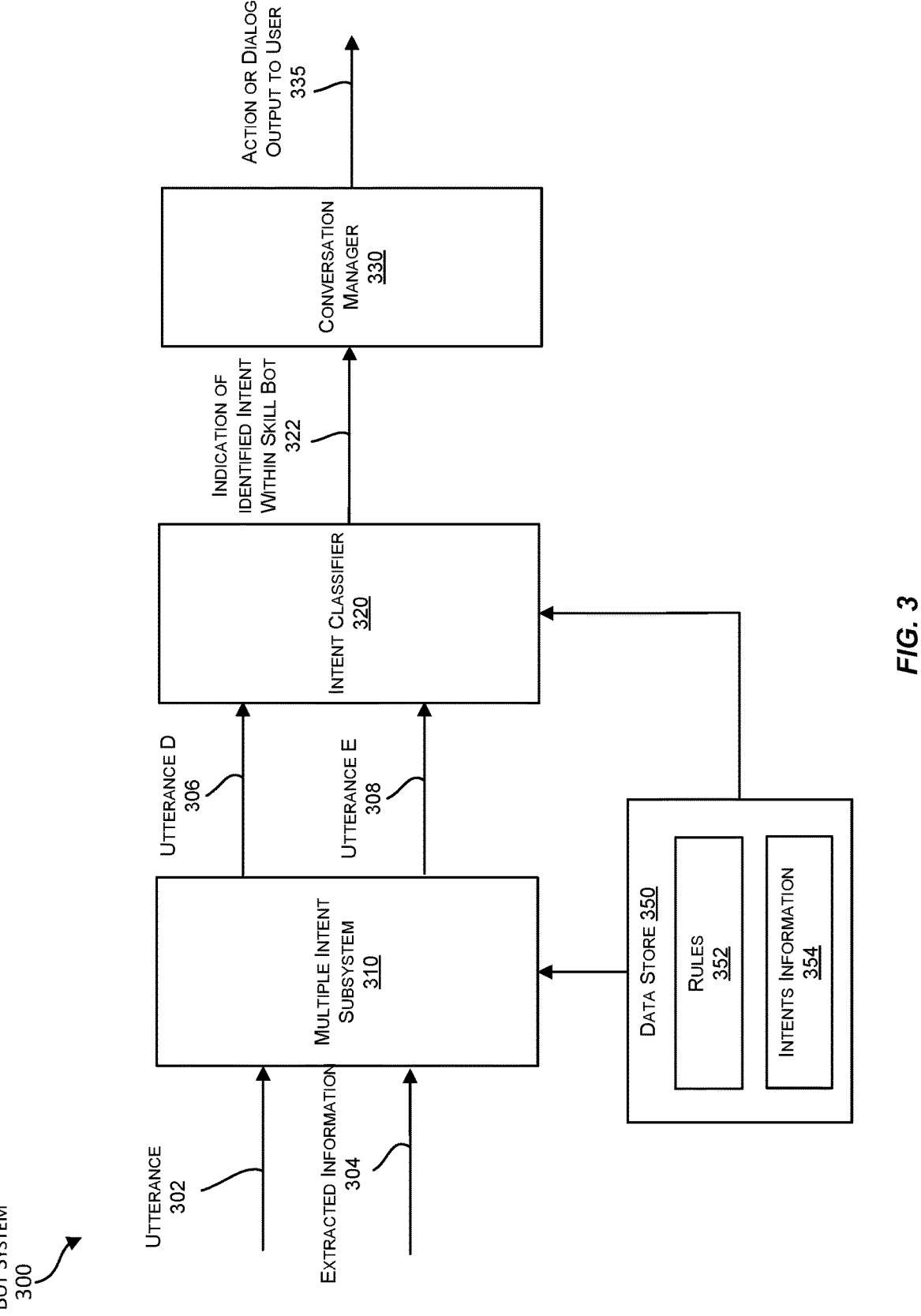
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 201 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 201. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 201 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Model Architecture for Language Detection

Figure 4:
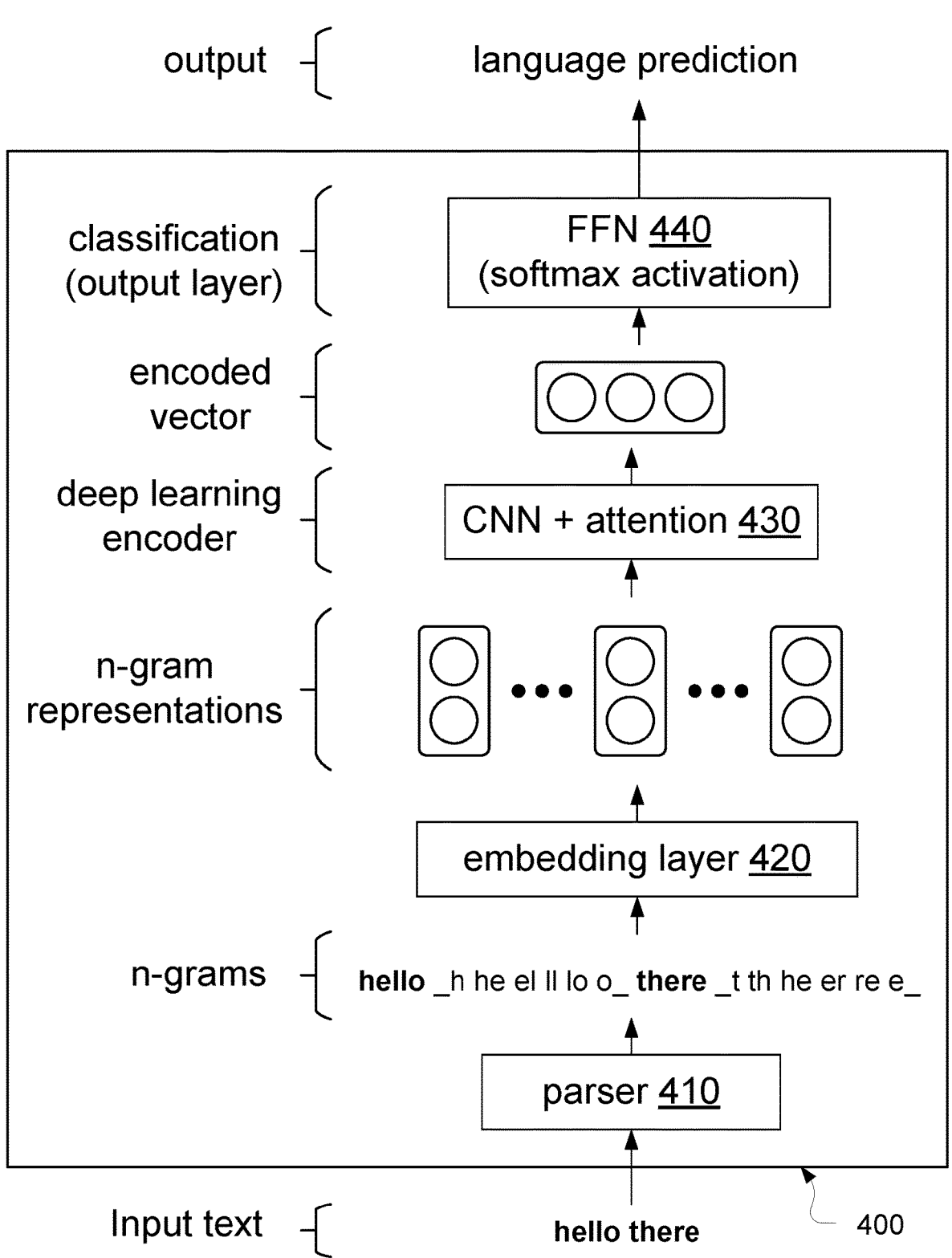
FIG. 4 shows one example of a model architecture according to various embodiments.

FIG. 4 shows one example 400 of a model architecture according to various embodiments. In this example, the input textual unit is split into n-grams at the word level, and each word in the textual unit is also split into character-based n-grams, to produce a sequence of n-grams for the textual unit (e.g., in accordance with the order in which the n-grams appear in the input textual unit). The operations of splitting the textual unit into n-grams at the word level and splitting the textual unit into n-grams at the character level may be performed in serial (e.g., word-level splitting followed by character-level splitting) or in parallel.

The value of n for the word-level n-grams may be the same as or different than the value of n for the character-level n-grams. In the example 400 of FIG. 4, the value of n for the word-level n-grams is one (word-based unigrams), and the value of n for the character-level n-grams is two (character-based bi-grams). Using this scheme, the textual unit "hello there" is converted (at parser 410) into the sequence of n-grams [hello, _h, he, el, ll, lo, o_, there, _t, th, he, er, re, e_] (alternatively, the sequence of n-grams [_h, he, el, ll, lo, o_, hello, _t, th, he, er, re, e_, there]). Note in this example that in order to indicate word boundaries, a special character (e.g., the underscore character "_") is added at the beginning and end of each word of the textual unit before the word is split into character-level n-grams.

Each n-gram in the sequence of n-grams is fed into an embedding layer 420 to generate a corresponding representation (e.g., a feature vector or "embedding vector") for the n-gram. The embedding layer 420 includes a trained embedding model (e.g., an embedding matrix that associates each n-gram with a corresponding embedding vector). A CNN with an attention mechanism 430 is employed to capture the relationship between n-gram features (as may be indicated by, for example, aspects such as the relative order and/or relative weight of the n-grams within the sequence) to produce an encoded vector for the textual unit. The encoded vector is classified using a feed-forward network (FFN) 440 and a softmax activation function to produce the output prediction (e.g., an identification of the predicted dominant language of the input textual unit).

In the example 400 described above with reference to FIG. 4, the vocabulary size is thirteen: two word-level uni-grams ("hello", "there") and eleven character-level bi-grams ("_h", "he", "el", "ll", "lo", "o_", "_t", "th", "er", "re", "e_"). In practice, the set of training data for a language detection task is large, and more than one hundred available languages may be represented, so that the vocabulary is typically huge (e.g., more than 30 million for an internal dataset of 105 million sentences). For example, the vocabulary may include a complete set of n-grams for Japanese or Chinese, another set of n-grams for Vietnamese, another set of n-grams for English, etc. Even if the dimensionality of the embedding vector space is relatively small (e.g., tens or hundreds of dimensions), the number of parameters in the embedding model may be exceedingly large, and the lookup may become very slow.

Figure 5:
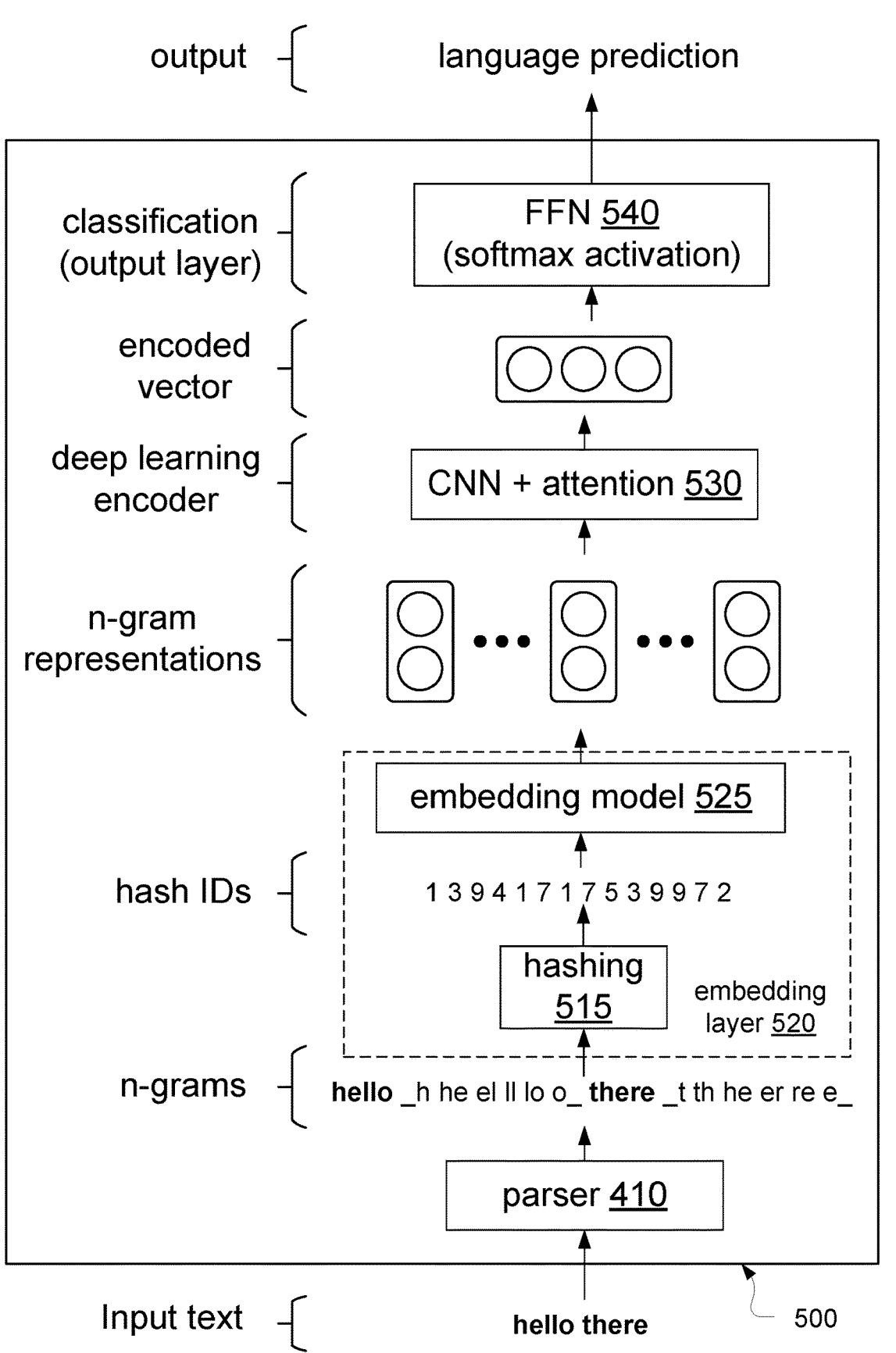
FIG. 5 shows another example of a model architecture according to various embodiments.

Hash embeddings may be used to reduce the size of the vocabulary and thereby to reduce the number of parameters in the embedding model. FIG. 5 shows an embodiment 500 of the model architecture of FIG. 4 in which the embedding layer 520 employs hash embedding by converting each n-gram from the parser 410 (at hashing operation 515) into a corresponding hash identifier (ID), which is then input to the embedding model 525 to obtain the corresponding n-gram representation (e.g., embedding vector). The range of the hash IDs in this example is zero to nine, so that the vocabulary size is reduced from 13 as in FIG. 4 to a fixed number of 10 in this case. As in the example 400 shown in FIG. 4, a CNN with attention model 530 may be employed to capture the relationship between n-gram features to produce an encoded vector for the textual unit, and the encoded vector may be classified using an FFN 540 and a softmax activation function to produce the output (language) prediction.

In one example, the size of the output range of the hash function is equal to the desired vocabulary size, and each of the hash IDs is obtained directly from the corresponding n-gram by applying the hash function to the n-gram. In other words, the hash ID for the n-gram is the hash value produced by applying the hash function to the n-gram. In another example, each of the hash IDs is obtained by applying the hash function to the n-gram and then applying a modulo B function to the resulting hash value, where B is the desired size of the vocabulary. In FIG. 5, for example, the hashing operation 515 may obtain each of the hash IDs by applying a version of the MurmurHash algorithm (e.g., MurmurHash1, MurmurHash2, or MurmurHash3) to an n-gram to obtain a corresponding hash value (e.g., a 32-bit hash value) and then applying a modulo 10 function to the hash value to obtain the corresponding hash ID.

Because the vocabulary size is less than the number of unique n-grams, hash embedding leads to collisions. As shown in FIG. 5, for example, the n-grams "hello" and "11" have the same hash ID of 1. A Bloom embedding algorithm may be used to greatly reduce the incidence of collisions. Specifically, instead of mapping an n-gram to a single hash ID, each n-gram may be mapped to two (or more) hash IDs. The probability that both (or all) of the hash IDs will be the same for any two n-grams is much less than the probability that two n-grams will map to the same hash ID.

Figure 6:
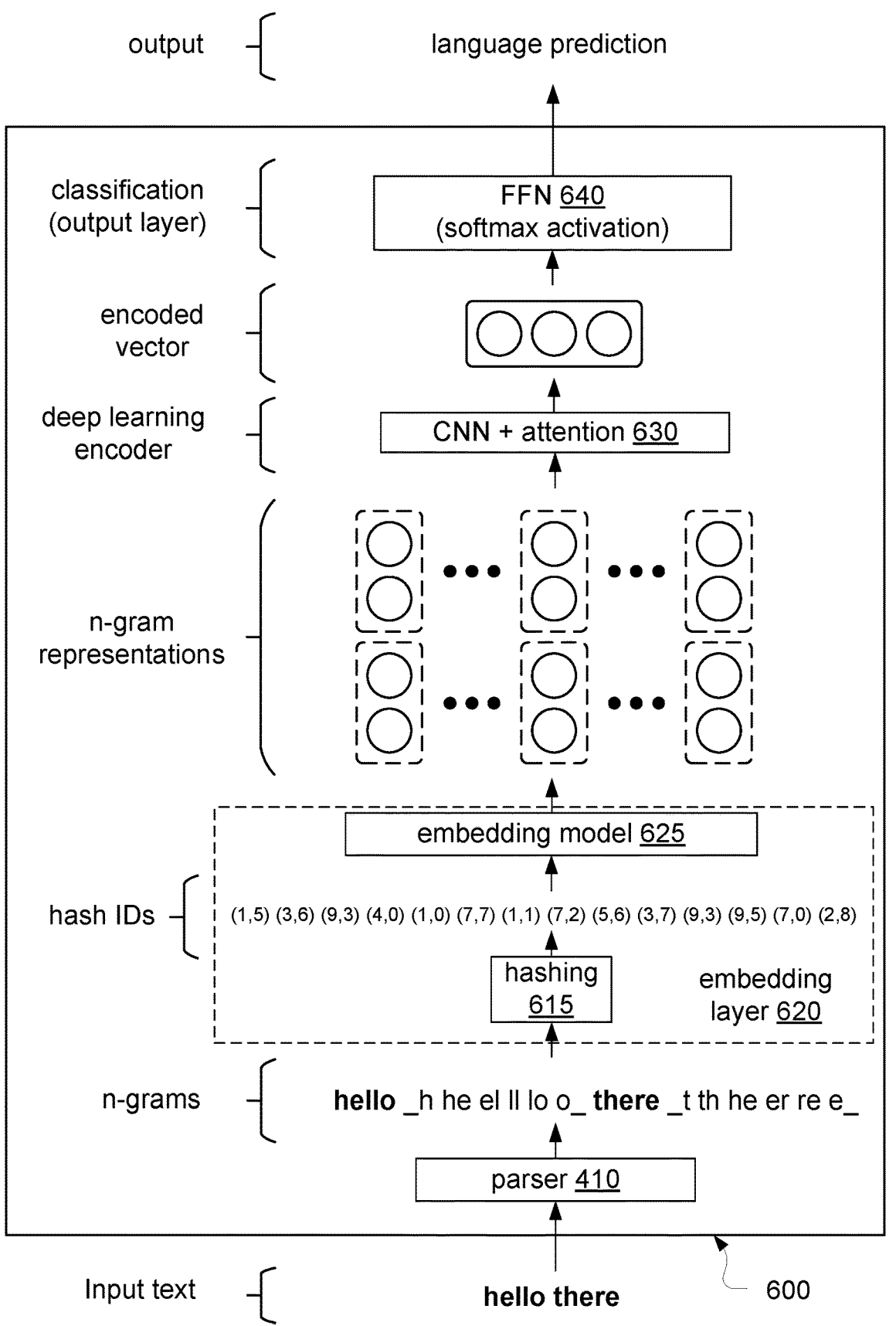
FIG. 6 shows an example in which the model architecture of FIG. 5 is modified in accordance with various embodiments.

FIG. 6 shows an example 600 in which an implementation 615 of the hashing operation 515 of the model architecture of FIG. 5 performs Bloom embedding to produce two hash IDs for each n-gram. This implementation 620 of the embedding layer 520 also includes an implementation 625 of the embedding model 525 that produces an embedding vector for each of the two hash IDs. The embedding vectors for the hash IDs are combined to obtain a embedding vector for the n-gram, which is input to the deep learning encoder 630. As in FIG. 5, the vocabulary size is set to the desired size B of the vocabulary (in this example, 10), but in this case, there is no collision in the hash buckets. As in the example 400 shown in FIG. 4, a CNN with attention model 630 may be employed to capture the relationship between n-gram features to produce an encoded vector for the textual unit, and the encoded vector may be classified using an FFN 640 and a softmax activation function to produce the output (language) prediction.

An n-gram-based wide model as described above with reference to FIGS. 4-6 was found to perform better than a character-based wide model (which would also need a much bigger CNN). The n-gram model may be implemented to include a lookup layer at the input to the deep network 430 (530, 630) (performing in, e.g., log(n) time) and then a small CNN layer on top, resulting in a running time that is much better than a character-based model in which the deep network 430 (530, 630) has a very large CNN layer on top.

A model architecture as shown in FIG. 5 or FIG. 6 may include several tunable hyper-parameters. For example, it may be desired to set the value of n for the word-based n-grams to 1 (unigrams) and to select three values of n for the character-based n-grams, that is 2, 3 and 4. For the hash embeddings, it may be desired to set the number of buckets (B) to three million (3 M) and to set the number of hashings to two to handle the collision problem. A grid search may be performed to determine values for the CNN window size and dropout probability. It may be found that the differences between hyper-parameter settings are not substantial. In order to speed up the training, it may be desired to set a maximum number of n-grams for each sentence (e.g., 512).

During training, the script information of the input characters (e.g., Latin, Devanagari, etc.) may be applied to limit the candidates for the prediction. For example, if the coding of the input textual unit is only in CJK (Chinese, Japanese, and Korean) script (e.g., as indicated by a Unicode encoding of the textual unit), then any predictions for Latin-based languages for that textual unit may be blocked. Additionally or alternatively, as a word can be used in many languages (e.g., the word "estas" may be used in Spanish and in Esperanto), it may be desired to integrate the relative popularities of the languages into the model prediction. For example, higher weights may be applied to predictions for more popular languages.

For purpose of comparison, the model architectures described above with reference to FIG. 5 and FIG. 6 are designated as "ODA-single API" and "ODA API", respectively. For demonstration and evaluation of these model architectures, the FastAPI web framework was used to build a RESTful serving application programming interface (API) (i.e., an API confirming to representational state transfer (REST) constraints). FIG. 7 shows an example of a request to the API, and FIG. 8 shows an example of a corresponding response from the API.

Training and Evaluation

Training data for a model architecture as described above was exported from the Open Parallel Corpus Project (OPUS) and from Common Crawl data and from Wikipedia. FIG. 9 shows a table that describes the OPUS source datasets. The dataset that was obtained from cleaned Common Crawl data comprises text from 176 languages, including more than one thousand (1K+) tokens from each of 165 languages, more than one million (1 M+) tokens from each of 127 languages, and more than one billion (1B+) tokens from each of 40 languages.

It may be assumed that if the model works well for short textual units, it will also tend to work well for long textual units. Short textual units were extracted from the OPUS datasets for training, including up to 10 M short sentences (<15 words) and up to 1 M long sentences (>=15 words and <30 words). As the set of Common Crawl data is large, first all of the page titles that contain no numbers or special characters were extracted, then the sentences were extracted from the body contents, with a limitation of 1.5 M sentences for each language. The resulting set of training data included text from 135 languages. As 35 of the 135 languages were ultimately removed due to a lack of training data, a total of 100 languages were supported in this example.

The following systems were selected for comparison:

1) FastText supports more than 170 languages, is freely accessible, and was found to produce better performances than other free language detection toolkits (e.g., langdetect, langid, Google's Compact Language Detector 2 (cld2), Google's Compact Language Detector 3 (cld3)).

2) Google language detection API (version supporting 109 languages).

3) Microsoft language detection API (version supporting 92 languages).

4) Amazon language detection API (version supporting 104 languages).

Two variants of the model architecture as shown in FIG. 6 (designated "ODA API") were used as baselines. The first variant (designated "CNN API") uses only a CNN, without the attention mechanism. The second variant (designated "AVG API") omits the CNN layer and uses an average pooling layer instead (e.g., as in fastText). A character-based CNN model ("Char-CNN") was also used as a pure deep learning baseline (e.g., to determine whether the combination of a deep neural network (DNN) with wide features performs better than a pure DNN). To mimic the wide features, a CNN with multikernel window sizes was used. A set of 69 overlapping languages that are supported by all of the comparison systems (including fastText, Google API, and Microsoft API) was selected.

FIG. 10 shows results from a language detection test using the ODA dataset (containing 335051 (335K) utterances) for validation and early stopping. This experiment is considered an ablation study (e.g., a study in which a component of the system is removed). The CNN and ODA APIs were found to achieve better performance than AGV API, which may indicate that the CNN layer is important to the success of the model. The ODA API (having an attention layer) was found to produce higher performance than the CNN API on the validation set. The ODA API (including the Bloom embeddings as in FIG. 6) was found to produce better performance on the validation set than the ODA-single API (as in FIG. 5). Note that there is no significant difference regarding the number of parameters between the models.

Results on the Chatterbot datasets showed the API's performance to be comparable to those of the Google, Microsoft and Amazon APIs. Results were also obtained on the EuroParl dataset (extracted from proceedings of the European Parliament and including sentence-aligned text in 21 European languages), the wiLI-2018 dataset (a dataset of short text extracts from Wikipedia that contains 235000 paragraphs of 235 languages), the LanideNN dataset, a first simple English test (ODA-10K examples), and a second simple English test (336 examples). Although fastText was found to produce the best performance among free language detection tools, its performances were found to be worse than all of the commercial APIs on the publicly available datasets. Among our APIs (ODA, CNN, and AVG), ODA with the combination of CNN and attention layers produces the best performances on all the datasets except for the simple English test. The performances produced by our ODA API on the Chatterbot datasets and our internal simple English test is also comparable to those produced by the Google, Microsoft and Amazon APIs. For the other datasets (e.g., LanideNN, EuroParl), our ODA API was found to perform better than the Google and Microsoft APIs. The combination of wide features and DNN was also found to produce better performance than pure DNN.

Techniques for Language Detection

Figure 11:
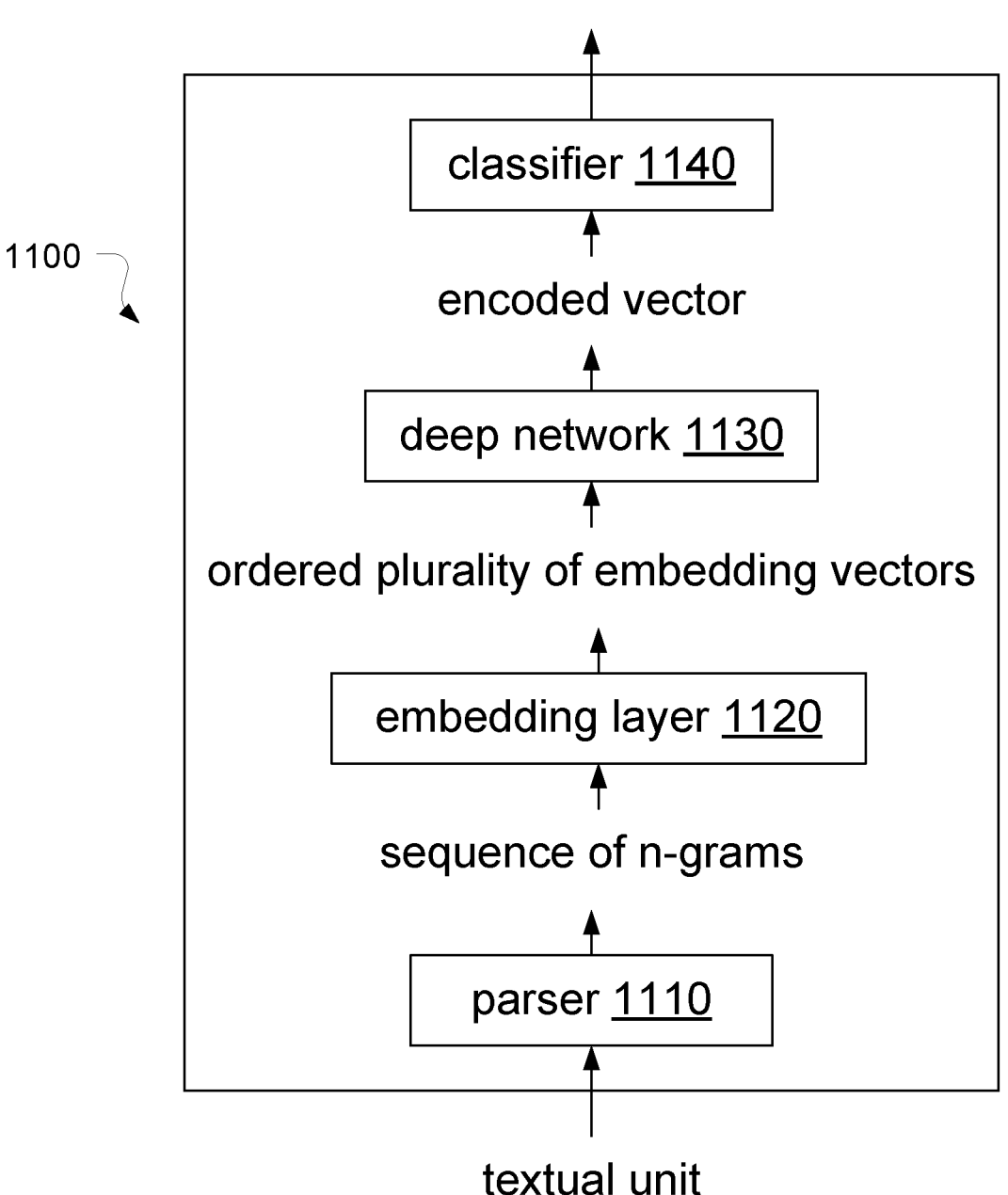
FIG. 11 shows a block diagram of an apparatus according to various embodiments.

FIG. 11 shows a block diagram of an apparatus 1100 according to various embodiments. The elements depicted in FIG. 11 may be implemented in software (e.g., code, instructions, modules, programs) executed by processing circuitry (e.g., one or more processing units, such as processors and/or cores) of the respective systems, hardware, or combinations thereof and coupled to memory (to store, e.g., the textual unit, a sequence of n-grams, and/or parameters of a trained network). Apparatus 1100 includes a parser 1110 that receives a textual unit as input and produces a corresponding sequence of n-grams of the textual unit (e.g., as described above with reference to splitting 410). The corresponding sequence of n-grams may include word-level n-grams and/or character-level n-grams, and the value of n for the plurality of character-level n-grams may be the same as or different than the value of n for the plurality of word-level n-grams. In one example, the corresponding sequence of n-grams includes word-level uni-grams and character-level bi-grams.

Apparatus 1100 also includes an embedding layer 1120 that receives the sequence of n-grams and produces a corresponding ordered plurality of embedding vectors for the sequence of n-grams. The ordered plurality of embedding vectors may be based on a plurality of component vectors (e.g., an embedding model, such as a trained embedding matrix). The order of the embedding vectors in the ordered plurality may indicate or otherwise correspond to the order of occurrence of the corresponding n-grams in the textual unit.

Apparatus 1100 also includes a deep network 1130 that receives the ordered plurality of embedding vectors and produces an encoded vector for the textual unit. The deep network comprises at least one hidden layer between its input and output layers and may include a trained CNN. The deep network may include an attention mechanism (e.g., one or more attention layers) to generate attention weights which indicate, for example, which n-grams should be paid more attention to (e.g., which n-grams should be more heavily weighted) when performing the prediction.

Figure 12:
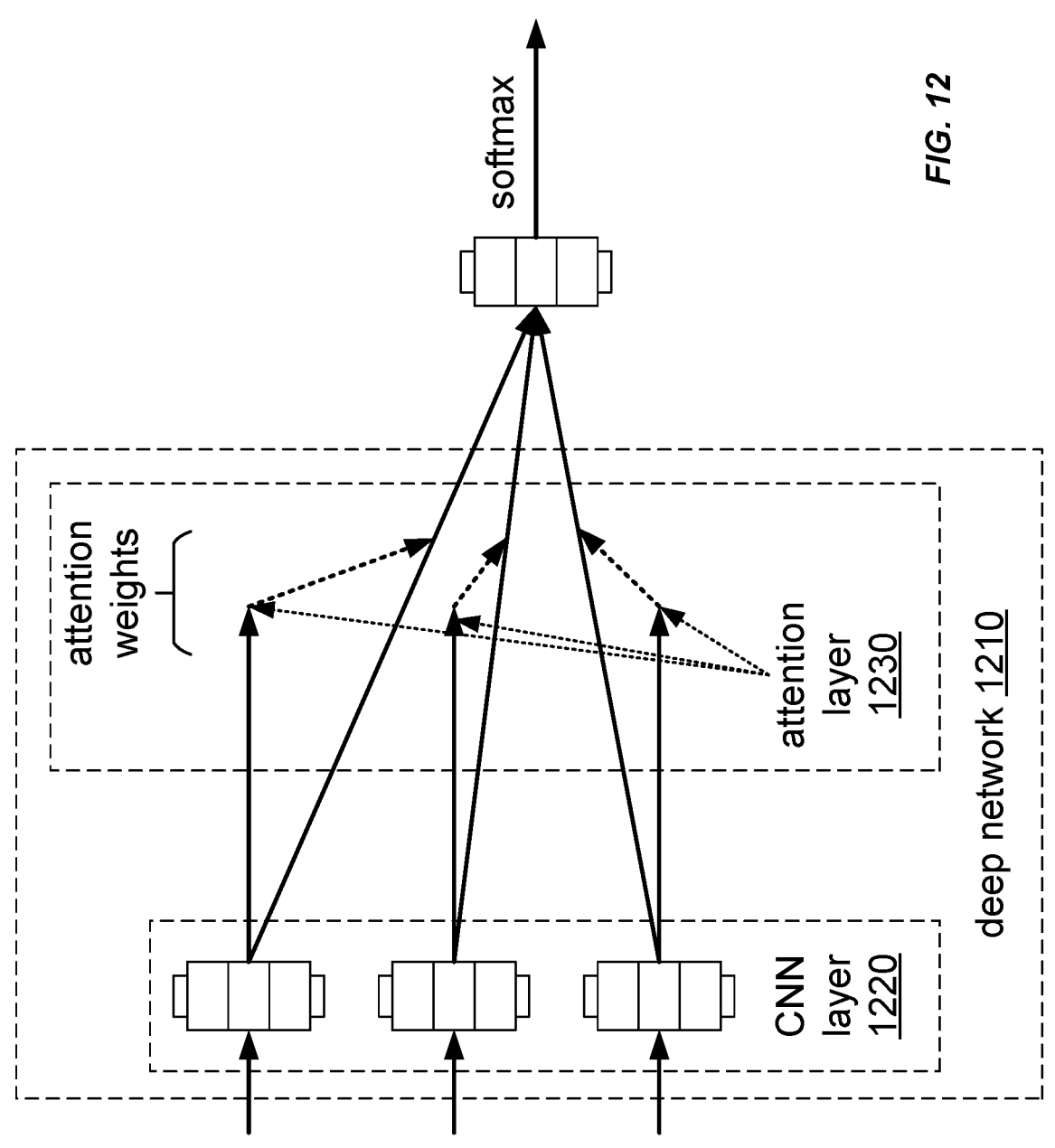
FIG. 12 shows an example of a deep network having an attention mechanism that may be included in an apparatus according to various embodiments.

FIG. 12 shows another example 1210 of the deep network 1130 that includes an attention mechanism. This mechanism includes an attention layer 1230 that is configured to assign attention weights (indicated as heavy dashed lines) to the output of the CNN layer 1220. The final encoded vector of the input text is the weighted sum of the CNN output (e.g., as weighted using the attention weights).

Apparatus 1100 also includes a classifier 1140 that receives the encoded vector and produces a language prediction for the textual unit. The classifier may include a feedforward neural network. In such case, the classifier may be configured to apply a softmax function to an output of a final layer of the feedforward neural network (e.g., as weighted using an attention layer as described with reference to FIG. 12).

Figure 13:
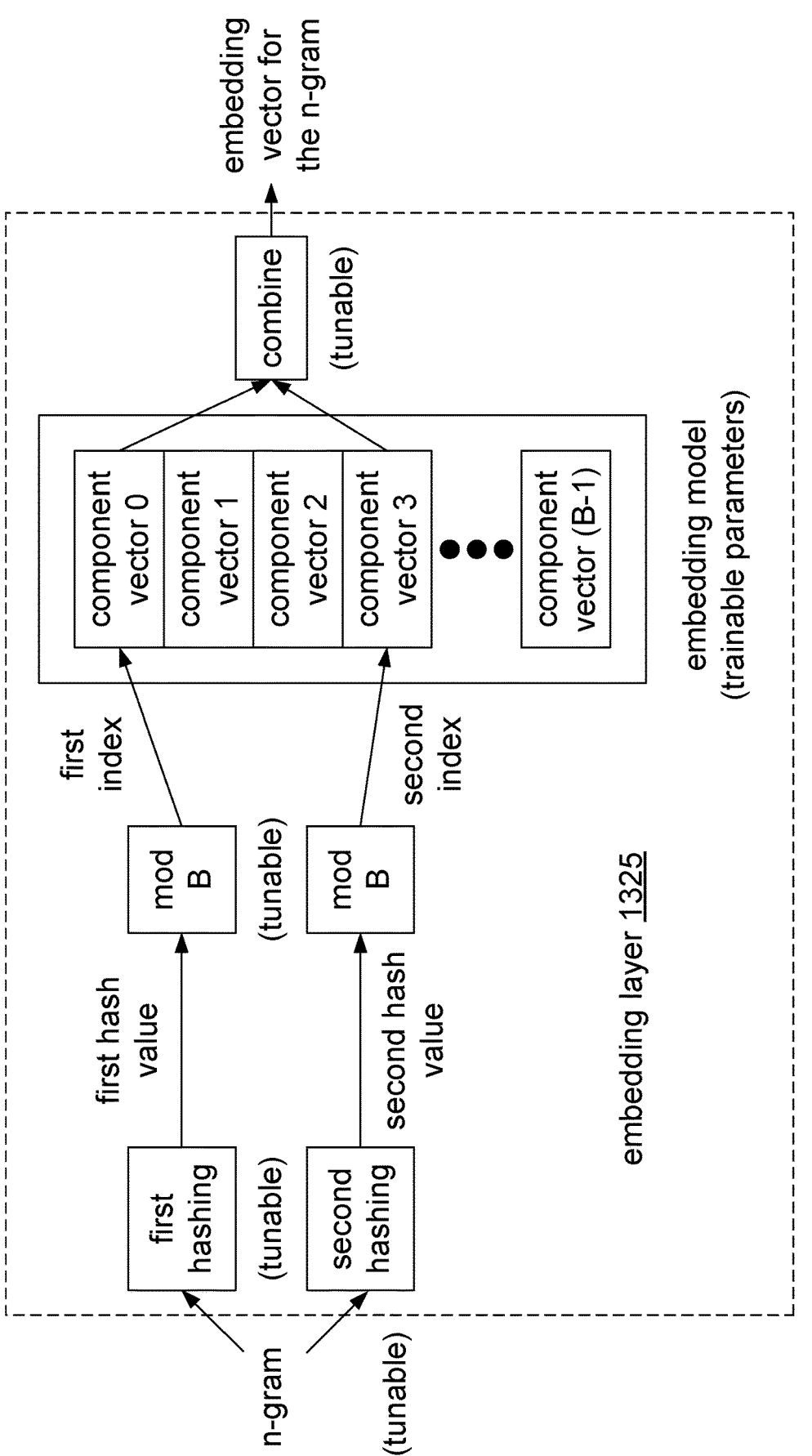
FIG. 13 shows an example of operations that may be performed by an embedding layer in accordance with various embodiments.

As noted above, the input textual unit may be parsed into a sequence of n-grams that may include word-level n-grams and/or character-level n-grams, where the value of n in each case may be a tunable parameter. FIG. 13 shows an example of operations that may be performed by an implementation 1325 of embedding layer 1120 to obtain, for each n-gram among of the sequence of n-grams, the corresponding embedding vector among the ordered plurality of embedding vectors. In this example, a first hashing is performed on the n-gram to obtain a first hash value, and a modulo B operation is applied to the first hash value to obtain a first index, where B is the number of component vectors in the trained plurality of component vectors (e.g., a trained embedding model). Likewise, a second hashing is performed on the n-gram to obtain a second hash value, and a modulo B operation is applied to the second hash value to obtain a second index. The component vectors that are indicated by the first and second indices are combined (e.g., concatenated, weighted, and/or added) to obtain the embedding vector for the n-gram, where the configuration of the combine operation may include one or more tunable parameters (e.g., whether the component vectors are concatenated/weighted/added, how the weights are determined, etc.).

FIG. 14 is a flowchart illustrating a process 1400 for language detection according to certain embodiments. The processing depicted in FIG. 14 may be implemented in software (e.g., code, instructions, programs) executed by one or more processing units (e.g., processors, cores) of the respective systems, hardware, or combinations thereof. The software may be stored on a non-transitory storage medium (e.g., on a memory device). The method presented in FIG. 14 and described below is intended to be illustrative and non-limiting. Although FIG. 14 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-3, the processing depicted in FIG. 14 may be performed by a pre-processing subsystem (e.g., language detector 212) to generate extracted information for use by one or more other subsystems (e.g., the multiple intent subsystem 220 or 310 and/or the explicit invocation subsystem 110 or intent classifier 320).

At block 1404, a sequence of n-grams of a textual unit is obtained by a data processing system (e.g., the chatbot system 106, 201, and/or 300 described with respect to FIGS. 1-3, respectively). Obtaining the sequence of n-grams may include receiving a textual unit as input and parsing the textual unit to produce the sequence of n-grams. The sequence of n-grams may include word-level n-grams and/or character-level n-grams, and the value of n for the plurality of character-level n-grams may be the same as or different than the value of n for the plurality of word-level n-grams. In one example, the sequence of n-grams includes word-level uni-grams and character-level bi-grams.

At block 1408, an embedding layer is used to obtain an ordered plurality of embedding vectors for the sequence of n-grams. The embedding layer includes a trained model having a plurality of component vectors.

At block 1412, a deep network is used to obtain an encoded vector that is based on the ordered plurality of embedding vectors. The deep network includes an attention mechanism (e.g., one or more attention layers). In various embodiments, the deep network may comprise a trained CNN.

At block 1416, a classifier is used to obtain a language prediction for the textual unit that is based on the encoded vector. In various embodiments, the classifier may include a feedforward neural network. In such case, using the classifier may include applying a softmax function to an output of a final layer of the feedforward neural network.

FIG. 15 is a flowchart illustrating a process 1500 for language detection according to certain embodiments. The processing depicted in FIG. 15 may be implemented in software (e.g., code, instructions, programs) executed by one or more processing units (e.g., processors, cores) of the respective systems, hardware, or combinations thereof. The software may be stored on a non-transitory storage medium (e.g., on a memory device). The method presented in FIG. 15 and described below is intended to be illustrative and non-limiting. Although FIG. 15 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-3, the processing depicted in FIG. 15 may be performed by a pre-processing subsystem (e.g., language detector 212) to generate extracted information for use by one or more other subsystems (e.g., the multiple intent subsystem 220 or 310 and/or the explicit invocation subsystem 110 or intent classifier 320).

Blocks 1504, 1512, and 1516 may be implemented according to the descriptions of blocks 1404, 1412, and 1416 above with reference to FIG. 14. At block 1508, an embedding layer is used to obtain an ordered plurality of embedding vectors for the sequence of n-grams. The embedding layer includes a trained model having a plurality of component vectors. Block 1508 includes blocks 1508*a-d* that may be performed to obtain a corresponding one of the ordered plurality of embedding vectors for each n-gram in the sequence of n-grams. At block 1508*a*, a first hash value for the n-gram and a second hash value for the n-gram are obtained. For example, obtaining the first hash value for the n-gram may include applying a hash function with a first seed value to the n-gram, and obtaining the second hash value for the n-gram may include applying the hash function with a second seed value to the n-gram, the second seed value being different than the first seed value. At block 1508*b*, based on the first hash value, a first component vector is selected from among the plurality of component vectors. At block 1508*c*, based on the second hash value, a second component vector is selected from among the plurality of component vectors. For example, process 1500 may include applying a modulo function to the first hash value to obtain a first index and applying the modulo function to the second hash value to obtain a second index, wherein selecting the first component vector may be based on the first index and selecting the second component vector may be based on the second index. At block 1508*d*; an embedding vector for the n-gram that is based on the first component vector and the second component vector is obtained. For example, the embedding vector may be obtained as a concatenation of the first component vector and the second component vector. Additionally or alternatively, obtaining the embedding vector for the n-gram may include applying a first weighting value to the first component vector to obtain a first weighted vector, and applying a second weighting value to the second component vector to obtain a second weighted vector, wherein the embedding vector is based on the first weighted vector and the second weighted vector.

Illustrative Systems

FIG. 16 depicts a simplified diagram of a distributed system 1600. In the illustrated example, distributed system 1600 includes one or more client computing devices 1602, 1604, 1606, and 1608, coupled to a server 1612 via one or more communication networks 1610. Clients computing devices 1602, 1604, 1606, and 1608 may be configured to execute one or more applications.

In various examples, server 1612 may be adapted to run one or more services or software applications that enable one or more embodiments described in this disclosure. In certain examples, server 1612 may also provide other services or software applications that may include non-virtual and virtual environments. In some examples, these services may be offered as web-based or cloud services, such as under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in FIG. 16, server 1612 may include one or more components 1618, 1620 and 1622 that implement the functions performed by server 1612. These components may include software components that may be executed by one or more processors, hardware components, or combinations thereof. It should be appreciated that various different system configurations are possible, which may be different from distributed system 1600. The example shown in FIG. 16 is thus one example of a distributed system for implementing an example system and is not intended to be limiting.

Users may use client computing devices 1602, 1604, 1606, and/or 1608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 16 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1612 may include one or more virtual machines running virtual operating systems, or other computing architectures involving virtualization such as one or more flexible pools of logical storage devices that may be virtualized to maintain virtual storage devices for the server. In various examples, server 1612 may be adapted to run one or more services or software applications that provide the functionality described in the foregoing disclosure.

The computing systems in server 1612 may run one or more operating systems including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more data repositories 1614, 1616. These data repositories may be used to store data and other information in certain examples. For example, one or more of the data repositories 1614, 1616 may be used to store information such as information related to chatbot performance or generated models for use by chatbots used by server 1612 when performing various functions in accordance with various embodiments. Data repositories 1614, 1616 may reside in a variety of locations. For example, a data repository used by server 1612 may be local to server 1612 or may be remote from server 1612 and in communication with server 1612 via a network-based or dedicated connection. Data repositories 1614, 1616 may be of different types. In certain examples, a data repository used by server 1612 may be a database, for example, a relational database, such as databases provided by Oracle Corpora-tion® and other vendors. One or more of these databases may be adapted to enable storage, update, and retrieval of data to and from the database in response to SQL-formatted commands.

In certain examples, one or more of data repositories 1614, 1616 may also be used by applications to store application data. The data repositories used by applications may be of different types such as, for example, a key-value store repository, an object store repository, or a general storage repository supported by a file system.

Figure 17:
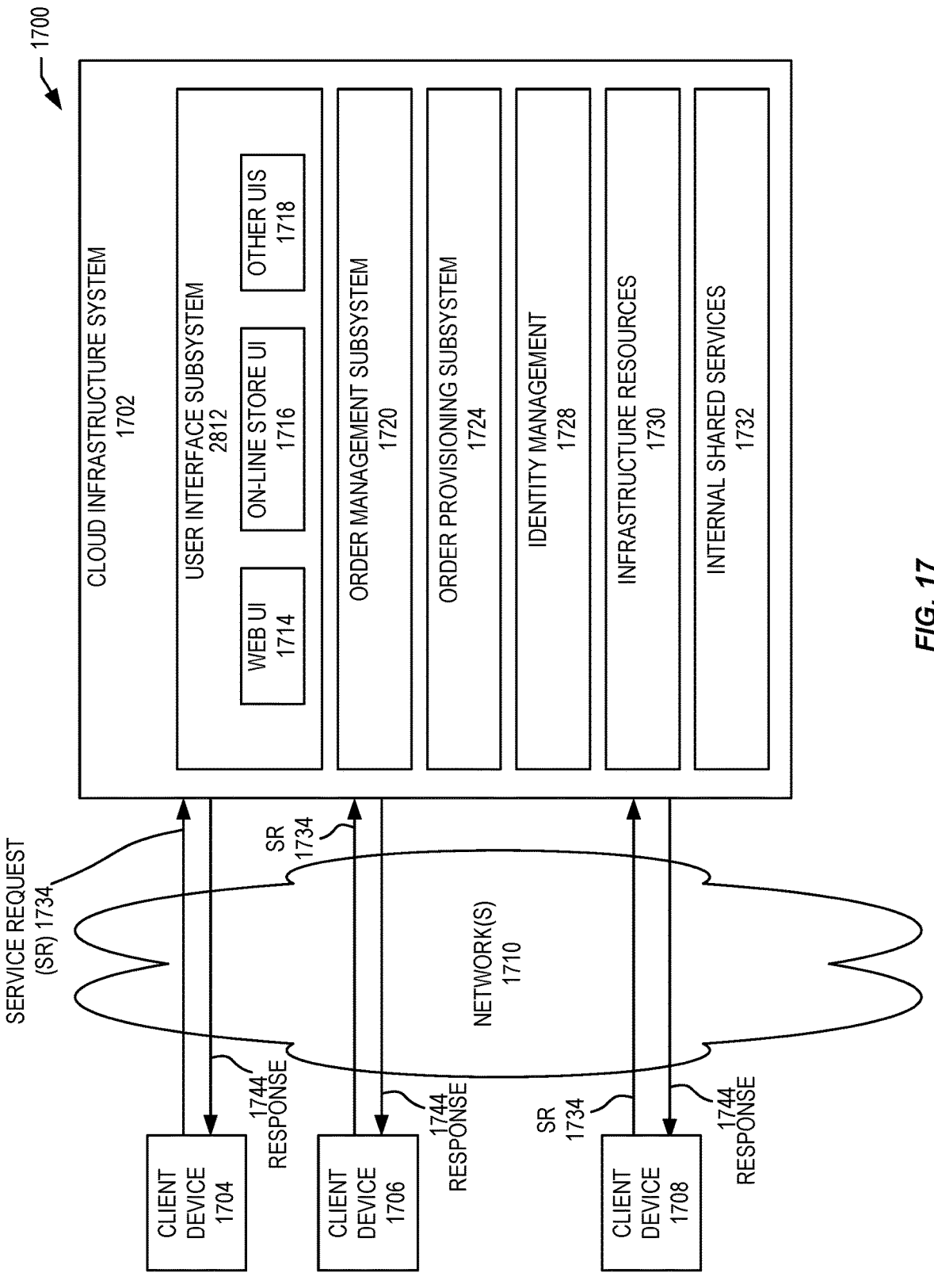
FIG. 17 is a simplified block diagram of one or more components of a system environment by which services provided by one or more components of an embodiment system may be offered as cloud services, in accordance with various embodiments.

In certain examples, the functionalities described in this disclosure may be offered as services via a cloud environ-ment. FIG. 17 is a simplified block diagram of a cloud-based system environment in which various services may be offered as cloud services in accordance with certain examples. In the example depicted in FIG. 17, cloud infra-structure system 1702 may provide one or more cloud services that may be requested by users using one or more client computing devices 1704, 1706, and 1708. Cloud infrastructure system 1702 may comprise one or more computers and/or servers that may include those described above for server 1612. The computers in cloud infrastructure system 1702 may be organized as general purpose comput-ers, specialized server computers, server farms, server clus-ters, or any other appropriate arrangement and/or combina-tion.

Network(s) 1710 may facilitate communication and exchange of data between clients 1704, 1706, and 1708 and cloud infrastructure system 1702. Network(s) 1710 may include one or more networks. The networks may be of the same or different types. Network(s) 1710 may support one or more communication protocols, including wired and/or wireless protocols, for facilitating the communications.

The example depicted in FIG. 17 is only one example of a cloud infrastructure system and is not intended to be limiting. It should be appreciated that, in some other examples, cloud infrastructure system 1702 may have more or fewer components than those depicted in FIG. 17, may combine two or more components, or may have a different configuration or arrangement of components. For example, although FIG. 17 depicts three client computing devices, any number of client computing devices may be supported in alternative examples.

The term cloud service is generally used to refer to a service that is made available to users on demand and via a communication network such as the Internet by systems (e.g., cloud infrastructure system 1702) of a service pro-vider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Sev-eral providers offer cloud services. For example, several cloud services are offered by Oracle Corporation® of Red-wood Shores, California, such as middleware services, data-base services, Java cloud services, and others.

In certain examples, cloud infrastructure system 1702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1702. Examples of SaaS services pro-vided by Oracle Corporation® include, without limitation, various services for human resources/capital management, customer relationship management (CRM), enterprise resource planning (ERP), supply chain management (SCM), enterprise performance management (EPM), analytics ser-vices, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various applica-tion development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1702. Cloud infrastructure system 1702 then performs processing to provide the services requested in the customer's subscrip-tion order. For example, a user may use utterances to request the cloud infrastructure system to take a certain action (e.g., an intent), as described above, and/or provide services for a chatbot system as described herein. Cloud infrastructure system 1702 may be configured to provide one or even multiple cloud services.

Cloud infrastructure system 1702 may provide the cloud services via different deployment models. In a public cloud model, cloud infrastructure system 1702 may be owned by a third party cloud services provider and the cloud services are offered to any general public customer, where the customer may be an individual or an enterprise. In certain other examples, under a private cloud model, cloud infrastructure system 1702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1702 and the services provided may be shared by several organizations in a related community. Various other models such as hybrids of the above mentioned models may also be used.

Client computing devices 1704, 1706, and 1708 may be of different types (such as client computing devices 1602, 1604, 1606, and 1608 depicted in FIG. 16) and may be capable of operating one or more client applications. A user may use a client device to interact with cloud infrastructure system 1702, such as to request a service provided by cloud infrastructure system 1702. For example, a user may use a client device to request information or action from a chatbot as described in this disclosure.

In some examples, the processing performed by cloud infrastructure system 1702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 17, cloud infrastructure system 1702 may include infrastructure resources 1730 that are utilized for facilitating the provision of various cloud services offered by cloud infrastructure system 1702. Infrastructure resources 1730 may include, for example, processing resources, storage or memory resources, networking resources, and the like. In certain examples, the storage virtual machines that are available for servicing storage requested from applications may be part of cloud infrastructure system 1702. In other examples, the storage virtual machines may be part of different systems.

In certain examples, to facilitate efficient provisioning of these resources for supporting the various cloud services provided by cloud infrastructure system 1702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1702 may itself internally use services 1732 that are shared by different components of cloud infrastructure system 1702 and which facilitate the provisioning of services by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1702 may comprise multiple subsystems. These subsystems may be implemented in software, or hardware, or combinations thereof. As depicted in FIG. 17, the subsystems may include a user interface subsystem 1712 that enables users or customers of cloud infrastructure system 1702 to interact with cloud infrastructure system 1702. User interface subsystem 1712 may include various different interfaces such as a web interface 1714, an online store interface 1716 where cloud services provided by cloud infrastructure system 1702 are advertised and are purchasable by a consumer, and other interfaces 1718. For example, a customer may, using a client device, request (service request 1734) one or more services provided by cloud infrastructure system 1702 using one or more of interfaces 1714, 1716, and 1718. For example, a customer may access the online store, browse cloud services offered by cloud infrastructure system 1702, and place a subscription order for one or more services offered by cloud infrastructure system 1702 that the customer wishes to subscribe to. The service request may include information identifying the customer and one or more services that the customer desires to subscribe to. For example, a customer may place a subscription order for a service offered by cloud infrastructure system 1702. As part of the order, the customer may provide information identifying a chatbot system for which the service is to be provided and optionally one or more credentials for the chatbot system.

In certain examples, such as the example depicted in FIG. 17, cloud infrastructure system 1702 may comprise an order management subsystem (OMS) 1720 that is configured to process the new order. As part of this processing, OMS 1720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1720 may then invoke the order provisioning subsystem (OPS) 1724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1724 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1702 as part of the provisioning process. Cloud infrastructure system 1702 may generate an application ID and select a storage virtual machine for an application from among storage virtual machines provided by cloud infrastructure system 1702 itself or from storage virtual machines provided by other systems other than cloud infrastructure system 1702.

Cloud infrastructure system 1702 may send a response or notification 1744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1702 and information identifying a chatbot system selected by cloud infrastructure system 1702 for the chatbot system corresponding to the chatbot system ID.

Cloud infrastructure system 1702 may provide services to multiple customers. For each customer, cloud infrastructure system 1702 is responsible for managing information related to one or more subscription orders received from the customer, maintaining customer data related to the orders, and providing the requested services to the customer. Cloud infrastructure system 1702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1702 may provide services to multiple customers in parallel. Cloud infrastructure system 1702 may store information for these customers, including possibly proprietary information. In certain examples, cloud infrastructure system 1702 comprises an identity management subsystem (IMS) 1728 that is configured to manage customer information and provide the separation of the managed information such that information related to one customer is not accessible by another customer. IMS 1728 may be configured to provide various security-related services such as identity services, such as information access management, authentication and authorization services, services for managing customer identities and roles and related capabilities, and the like.

Figure 18:
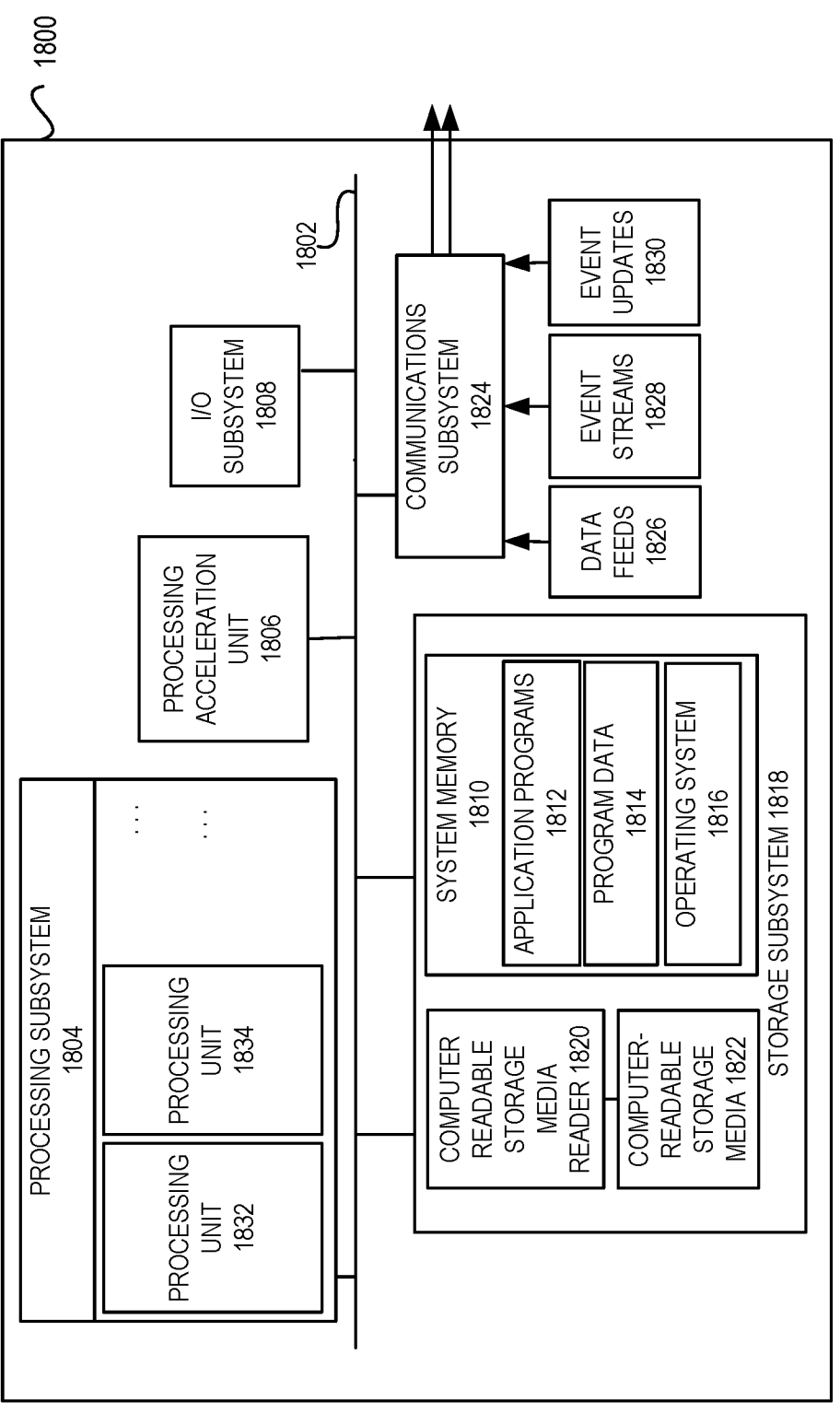
FIG. 18 illustrates an example computer system that may be used to implement various embodiments.

FIG. 18 illustrates an example of computer system 1800. In some examples, computer system 1800 may be used to implement any of the digital assistant or chatbot systems within a distributed environment, and various servers and computer systems described above. As shown in FIG. 18, computer system 1800 includes various subsystems including a processing subsystem 1804 that communicates with a number of other subsystems via a bus subsystem 1802. These other subsystems may include a processing acceleration unit 1806, an I/O subsystem 1808, a storage subsystem 1818, and a communications subsystem 1824. Storage subsystem 1818 may include non-transitory computer-readable storage media including storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative examples of the bus subsystem may utilize multiple buses. Bus subsystem 1802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P13156.1 standard, and the like.

Processing subsystem 1804 controls the operation of computer system 1800 and may comprise one or more processors, application specific integrated circuits (ASICs), or field programmable gate arrays (FPGAs). The processors may include be single core or multicore processors. The processing resources of computer system 1800 may be organized into one or more processing units 1832, 1834, etc. A processing unit may include one or more processors, one or more cores from the same or different processors, a combination of cores and processors, or other combinations of cores and processors. In some examples, processing subsystem 1804 may include one or more special purpose co-processors such as graphics processors, digital signal processors (DSPs), or the like. In some examples, some or all of the processing units of processing subsystem 1804 may be implemented using customized circuits, such as application specific integrated circuits (ASICs), or field programmable gate arrays (FPGAs).

In some examples, the processing units in processing subsystem 1804 may execute instructions stored in system memory 1810 or on computer readable storage media 1822. In various examples, the processing units may execute a variety of programs or code instructions and may maintain multiple concurrently executing programs or processes. At any given time, some or all of the program code to be executed may be resident in system memory 1810 and/or on computer-readable storage media 1822 including potentially on one or more storage devices. Through suitable programming, processing subsystem 1804 may provide various functionalities described above. In instances where computer system 1800 is executing one or more virtual machines, one or more processing units may be allocated to each virtual machine.

In certain examples, a processing acceleration unit 1806 may optionally be provided for performing customized processing or for off-loading some of the processing performed by processing subsystem 1804 so as to accelerate the overall processing performed by computer system 1800.

I/O subsystem 1808 may include devices and mechanisms for inputting information to computer system 1800 and/or for outputting information from or via computer system 1800. In general, use of the term input device is intended to include all possible types of devices and mechanisms for inputting information to computer system 1800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1818 provides a repository or data store for storing information and data that is used by computer system 1800. Storage subsystem 1818 provides a tangible non-transitory computer-readable storage medium for storing the basic programming and data constructs that provide the functionality of some examples. Storage subsystem 1818 may store software (e.g., programs, code modules, instructions) that when executed by processing subsystem 1804 provides the functionality described above. The software may be executed by one or more processing units of processing subsystem 1804. Storage subsystem 1818 may also provide authentication in accordance with the teachings of this disclosure.

Storage subsystem 1818 may include one or more non-transitory memory devices, including volatile and non-volatile memory devices. As shown in FIG. 18, storage subsystem 1818 includes a system memory 1810 and a computer-readable storage media 1822. System memory 1810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1800, such as during start-up, may typically be stored in the ROM. The RAM typically contains data and/or program modules that are presently being operated and executed by processing subsystem 1804. In some implementations, system memory 1810 may include multiple different types of memory, such as static random access memory (SRAM), dynamic random access memory (DRAM), and the like.

By way of example, and not limitation, as depicted in FIG. 18, system memory 1810 may load application programs 1812 that are being executed, which may include various applications such as Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1822 may store programming and data constructs that provide the functionality of some examples. Computer-readable media 1822 may provide storage of computer-readable instructions, data structures, program modules, and other data for computer system 1800. Software (programs, code modules, instructions) that, when executed by processing subsystem 1804 provides the functionality described above, may be stored in storage subsystem 1818. By way of example, computer-readable storage media 1822 may include non-volatile memory such as a hard disk drive, a magnetic disk drive, an optical disk drive such as a CD ROM, DVD, a Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1818 may also include a computer-readable storage media reader 1820 that may further be connected to computer-readable storage media 1822. Reader 1820 may receive and be configured to read data from a memory device such as a disk, a flash drive, etc.

In certain examples, computer system 1800 may support virtualization technologies, including but not limited to virtualization of processing and memory resources. For example, computer system 1800 may provide support for executing one or more virtual machines. In certain examples, computer system 1800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1800. Accordingly, multiple operating systems may potentially be run concurrently by computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to establish a communication channel to one or more client devices via the Internet for receiving and sending information from and to the client devices. For example, when computer system 1800 is used to implement bot system 120 depicted in FIG. 1, the communication subsystem may be used to communicate with a chatbot system selected for an application.

Communication subsystem 1824 may support both wired and/or wireless communication protocols. In certain examples, communications subsystem 1824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.XX family standards, or other mobile communication technologies, or any combination thereof), global positioning system (GPS) receiver components, and/or other components. In some examples, communications subsystem 1824 may provide wired network connectivity (e.g., Ethernet) in addition to or instead of a wireless interface.

Communication subsystem 1824 may receive and transmit data in various forms. In some examples, in addition to other forms, communications subsystem 1824 may receive input communications in the form of structured and/or unstructured data feeds 1826, event streams 1828, event updates 1830, and the like. For example, communications subsystem 1824 may be configured to receive (or send) data feeds 1826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1824 may be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1824 may also be configured to communicate data from computer system 1800 to other computer systems or networks. The data may be communicated in various different forms such as structured and/or unstructured data feeds 1826, event streams 1828, event updates 1830, and the like to one or more databases that may be in communication with one or more streaming data source computers coupled to computer system 1800.

Computer system 1800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1800 depicted in FIG. 18 is intended only as a specific example. Many other configurations having more or fewer components than the system depicted in FIG. 18 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
receiving, by a digital assistant system, a textual unit;
generating, by a language detection apparatus, a language prediction for the textual unit, the language prediction identifying a language associated with the textual unit, wherein the language detection apparatus comprises:
a parser configured to parse the textual unit to obtain a sequence of n-grams of the textual unit;
an embedding layer configured to obtain an ordered plurality of embedding vectors for the sequence of n-grams, wherein the embedding layer comprises a trained model having a plurality of component vectors, and wherein the embedding layer is configured to obtain the ordered plurality of embedding vectors by, for each n-gram in the sequence of n-grams:
obtaining a first hash value for the n-gram and a second hash value for the n-gram,
selecting, based on the first hash value, a first component vector from among the plurality of component vectors, selecting, based on the second hash value, a second component vector from among the plurality of component vectors, and
obtaining an embedding vector for the n-gram that is based on the first component vector and the second component vector;
a deep network configured to obtain an encoded vector that is based on the ordered plurality of embedding vectors, wherein the deep network comprises a convolutional neural network (CNN) layer and an attention layer, and wherein the attention layer is configured to assign weights to an output of the CNN layer; and
a classifier configured to obtain the language prediction for the textual unit based on the encoded vector; and
generating, by the digital assistant system, a response for the textual unit in the language associated with the textual unit.

2. The method of claim 1, wherein the sequence of n-grams includes a plurality of character-level n-grams and a plurality of word-level n-grams.

3. The method of claim 2, wherein the value of n for the plurality of character-level n-grams is different than the value of n for the plurality of word-level n-grams.

4. The method of claim 1, wherein the encoded vector is a weighted sum of the output of the CNN layer.

5. The method of claim 1, wherein, for each n-gram in the sequence of n-grams:
obtaining the first hash value for the n-gram comprises applying a hash function with a first seed value to the n-gram, and
obtaining the second hash value for the n-gram comprises applying the hash function with a second seed value to the n-gram, the second seed value being different than the first seed value.

6. The method of claim 1, wherein using the embedding layer to obtain the ordered plurality of embedding vectors comprises, for each n-gram in the sequence of n-grams, applying a modulo function to the first hash value to obtain a first index and applying the modulo function to the second hash value to obtain a second index, wherein selecting the first component vector is based on the first index and selecting the second component vector is based on the second index.

7. The method of claim 1, wherein, for each n-gram in the sequence of n-grams, obtaining the embedding vector for the n-gram comprises concatenating the first component vector and the second component vector.

8. The method of claim 1, wherein, for each n-gram in the sequence of n-grams, obtaining the embedding vector for the n-gram comprises:
applying a first weighting value to the first component vector to obtain a first weighted vector, and
applying a second weighting value to the second component vector to obtain a second weighted vector, wherein the embedding vector is based on the first weighted vector and the second weighted vector.

9. The method of claim 1, wherein the classifier includes a feedforward neural network.

10. The method of claim 9, wherein using the classifier comprises applying a softmax function to an output of a final layer of the feedforward neural network.

11. A system comprising:
one or more data processors; and
one or more non-transitory computer readable media storing instructions which, when executed by the one or more data processors cause the one or more data processors to perform processing comprising:

receiving a textual unit;

generating a language prediction for the textual unit, the language prediction identifying a language associated with the textual unit, wherein generating the language prediction comprises:

parsing the textual unit to obtain a sequence of n-grams of the textual unit;

using an embedding layer to obtain an ordered plurality of embedding vectors for the sequence of n-grams, wherein the embedding layer comprises a trained model having a plurality of component vectors, and wherein the embedding layer is con-figured to obtain the ordered plurality of embedding vectors by, for each n-gram in the sequence of n-grams:

obtaining a first hash value for the n-gram and a second hash value for the n-gram, selecting, based on the first hash value, a first component vector from among the plurality of component vectors, selecting, based on the second hash value, a sec-ond component vector from among the plurality of component vectors, and obtaining an embedding vector for the n-gram that is based on the first component vector and the second component vector;

using a deep network to obtain an encoded vector that is based on the ordered plurality of embedding vectors, wherein the deep network comprises a convolutional neural network (CNN) layer and an attention layer, and wherein the attention layer is configured to assign weights to an output of the CNN layer; and using a classifier to obtain the language prediction for the textual unit based on the encoded vector; and generating a response for the textual unit in the lan-guage associated with the textual unit.

12. The system of claim 11, wherein, for each n-gram in the sequence of n-grams:

obtaining the first hash value for the n-gram comprises applying a hash function with a first seed value to the n-gram, and obtaining the second hash value for the n-gram comprises applying the hash function with a second seed value to the n-gram, the second seed value being different than the first seed value.

13. The system of claim 11, wherein using the embedding layer to obtain the ordered plurality of embedding vectors comprises, for each n-gram in the sequence of n-grams, applying a modulo function to the first hash value to obtain a first index and applying the modulo function to the second hash value to obtain a second index, wherein selecting the first component vector is based on the first index and selecting the second component vector is based on the second index.

14. The system of claim 11, wherein, for each n-gram in the sequence of n-grams, obtaining the embedding vector for the n-gram comprises:

applying a first weighting value to the first component vector to obtain a first weighted vector, and applying a second weighting value to the second compo-nent vector to obtain a second weighted vector, wherein the embedding vector is based on the first weighted vector and the second weighted vector.

15. The system of claim 11, wherein training of the deep network comprises restricting a language prediction accord-ing to script information of a corresponding input textual unit.

16. A computer-program product tangibly embodied in one or more non-transitory machine-readable media, includ-ing instructions configured to cause one or more data processors to perform processing comprising:

receiving, by a digital assistant system, a textual unit;

generating, by a language detection apparatus, a language prediction for the textual unit, the language prediction identifying a language associated with the textual unit, wherein the language detection apparatus comprises:

a parser configured to parse the textual unit to obtain a sequence of n-grams of the textual unit;

an embedding layer configured to obtain an ordered plurality of embedding vectors for the sequence of n-grams, wherein the embedding layer comprises a trained model having a plurality of component vec-tors, and wherein the embedding layer is configured to obtain the ordered plurality of embedding vectors by, for each n-gram in the sequence of n-grams:

obtaining a first hash value for the n-gram and a second hash value for the n-gram, selecting, based on the first hash value, a first com-ponent vector from among the plurality of com-ponent vectors, selecting, based on the second hash value, a second component vector from among the plurality of component vectors, and obtaining an embedding vector for the n-gram that is based on the first component vector and the sec-ond component vector;

a deep network configured to obtain an encoded vector that is based on the ordered plurality of embedding vectors, wherein the deep network comprises a con-volutional neural network (CNN) layer and an atten-tion layer, and wherein the attention layer is config-ured to assign weights to an output of the CNN layer; and a classifier configured to obtain the language prediction for the textual unit based on the encoded vector; and generating, by the digital assistant system, a response for the textual unit in the language associated with the textual unit.

17. The computer-program product of claim 16, wherein, for each n-gram in the sequence of n-grams:

obtaining the first hash value for the n-gram comprises applying a hash function with a first seed value to the n-gram, and obtaining the second hash value for the n-gram comprises applying the hash function with a second seed value to the n-gram, the second seed value being different than the first seed value.

18. The computer-program product of claim 16, wherein using the embedding layer to obtain the ordered plurality of embedding vectors comprises, for each n-gram in the sequence of n-grams, applying a modulo function to the first hash value to obtain a first index and applying the modulo function to the second hash value to obtain a second index, wherein selecting the first component vector is based on the first index and selecting the second component vector is based on the second index.

19. The computer-program product of claim 16, wherein, for each n-gram in the sequence of n-grams, obtaining the embedding vector for the n-gram comprises:

applying a first weighting value to the first component vector to obtain a first weighted vector, and applying a second weighting value to the second component vector to obtain a second weighted vector, wherein the embedding vector is based on the first weighted vector and the second weighted vector.

20. The computer-program product of claim 16, wherein using the deep network comprises:

applying a first attention weight to a first feature value that corresponds to a first n-gram among the sequence of n-grams, and applying a second attention weight that is different than the first attention weight to a second feature value that corresponds to a second n-gram among the sequence of n-grams.

* * * * *